United States Patent
Wu et al.

(10) Patent No.: US 11,882,603 B2
(45) Date of Patent: Jan. 23, 2024

(54) RANDOM ACCESS METHOD, APPARATUS, DEVICE, AND STORAGE DEVICE

(71) Applicant: HUAWEI TECHNOLOGIES CO., LTD., Shenzhen (CN)

(72) Inventors: Ji Wu, Shanghai (CN); Jun Zhu, Shenzhen (CN); Qiong Jia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 495 days.

(21) Appl. No.: 17/171,076

(22) Filed: Feb. 9, 2021

(65) Prior Publication Data

US 2021/0168876 A1 Jun. 3, 2021

Related U.S. Application Data

(63) Continuation of application No. PCT/CN2019/099936, filed on Aug. 9, 2019.

(30) Foreign Application Priority Data

Aug. 10, 2018 (CN) .......................... 201810912253.4

(51) Int. Cl.
*H04W 4/00* (2018.01)
*H04W 74/08* (2009.01)
(Continued)

(52) U.S. Cl.
CPC ....... *H04W 74/0833* (2013.01); *H04L 5/0016* (2013.01); *H04W 72/0453* (2013.01);
(Continued)

(58) Field of Classification Search
CPC ......... H04W 74/0833; H04W 72/0453; H04W 74/008; H04W 74/0808; H04W 76/11; H04L 5/0016; H04J 13/004; H04J 13/18
(Continued)

(56) References Cited

U.S. PATENT DOCUMENTS 9,271,285 B2 * 2/2016 Suzuki .................. H04L 5/0051
10,362,542 B2 * 7/2019 Fu .......................... H04L 5/0048
(Continued)

FOREIGN PATENT DOCUMENTS

CN       101980576 A     2/2011
CN       107666712 A     2/2018
(Continued)

OTHER PUBLICATIONS

ZTE Corporation et al,"On 2-step Random access procedure",3GPP TSG RAN WG1 Meeting #86b , R1-1608969, Lisbon, Portugal, Oct. 10-14, 2016, total 3 pages.
(Continued)

*Primary Examiner* — Amancio Gonzalez
(74) *Attorney, Agent, or Firm* — Rimon PC

(57) ABSTRACT

This application provides a random access method, apparatus, and device, and a storage medium. The method includes: A terminal device scrambles first identification information of the terminal device by using an OCC, and sends a first message to a network device. After receiving the first message sent by the terminal device, the network device sends a second message to the terminal device based on the first message, where the second message includes identification information of one or more terminal devices that succeed in random access, so that the terminal device can determine, based on the identification information of the one or more terminal devices the one or more terminal devices include the first identification information of this terminal device, whether this terminal device succeeds or fails in random access.

19 Claims, 10 Drawing Sheets

(51) Int. Cl.
  *H04W 76/11* (2018.01)
  *H04L 5/00* (2006.01)
  *H04W 72/0453* (2023.01)
  *H04W 74/00* (2009.01)

(52) U.S. Cl.
  CPC ..... *H04W 74/008* (2013.01); *H04W 74/0808* (2013.01); *H04W 76/11* (2018.02)

(58) Field of Classification Search
  USPC .......................................................... 370/329
  See application file for complete search history.

(56) References Cited

U.S. PATENT DOCUMENTS

| | | | |
|---|---|---|---|
| 10,382,107 B2* | 8/2019 | Davydov | H04L 1/1812 |
| 10,651,982 B2* | 5/2020 | Takeda | H04L 1/1854 |
| 10,701,684 B2* | 6/2020 | Yoo | H04L 1/1861 |
| 10,827,530 B2* | 11/2020 | Hui | H04B 7/0695 |
| 10,834,709 B2* | 11/2020 | Yang | H04J 13/18 |
| 10,856,323 B2* | 12/2020 | Park | H04W 72/23 |
| 11,044,627 B2* | 6/2021 | Chendamarai Kannan | H04B 7/0695 |
| 11,212,800 B2* | 12/2021 | Yoo | H04L 27/2613 |
| 11,394,501 B2* | 7/2022 | Yeo | H04B 7/26 |
| 2018/0205516 A1 | 7/2018 | Jung et al. | |
| 2018/0367358 A1* | 12/2018 | Baligh | H04J 11/005 |
| 2021/0329703 A1* | 10/2021 | Yang | H04L 5/001 |
| 2021/0329704 A1* | 10/2021 | Yang | H04W 72/23 |
| 2022/0353026 A1* | 11/2022 | Yeo | H04L 5/0007 |

FOREIGN PATENT DOCUMENTS

| | | |
|---|---|---|
| CN | 108111270 A | 6/2018 |
| CN | 108282899 A | 7/2018 |
| CN | 108282901 A | 7/2018 |
| KR | 20170114971 A | 10/2017 |
| WO | 2013097656 A1 | 7/2013 |
| WO | 2017161995 A1 | 9/2017 |
| WO | 2017209417 A1 | 12/2017 |
| WO | 2018028662 A1 | 2/2018 |
| WO | 2018129123 A1 | 7/2018 |

OTHER PUBLICATIONS

ZTE Corporation, ZTE Microelectronics, On 2-step RACH procedure in NR. 3GPP TSG RAN WG1 Meeting #87, Reno, USA, Nov. 14-18, 2016, R1-1611274, 4 pages.

CATT,"Discussion of Simplified RACH Procedures",3GPP TSG RAN WG1 Meeting #87 R1-1611376, Reno, USA, Nov. 14-18, 2016,total 3 pages.

LG Electronics,"On simplified RACH procedure",3GPP TSG RAN WG1 Meeting #87 R1-1611798,Reno, USA Nov. 14-18, 2016,total 3 pages.

MediaTek Inc.,"Considerations on 2-step RACH physical channel design",3GPP TSG RAN WG1 Meeting #87 R1-1612142,Reno, USA 14th Nov. 18, 2016,total 3 pages.

Samsung,"Discussion on simplified RACH procedure",3GPP TSG RAN WG1 Meeting #87 R1-1612468,Reno, Nevada, USA, 14th Nov. 18, 2016,total 5 pages.

* cited by examiner

RANDOM ACCESS METHOD, APPARATUS, DEVICE, AND STORAGE DEVICE

CROSS-REFERENCE TO RELATED APPLICATIONS

This application is a continuation of International Application No. PCT/CN2019/099936, filed on Aug. 9, 2019, which claims priority to Chinese Patent Application No. 201810912253.4, filed on Aug. 10, 2018. The disclosures of the aforementioned applications are hereby incorporated by reference in their entireties.

TECHNICAL FIELD

This application relates to the field of communications technologies, and in particular, to a random access method, apparatus, and device, and a storage medium.

BACKGROUND

After obtaining a cell through searching, a terminal device may synchronize with the cell, to receive downlink data. However, the terminal device needs to synchronize with the cell before sending uplink data. The terminal device may synchronize with the cell by using a contention-based random access process. The contention-based random access process is implemented in four steps: The terminal device sends a preamble (namely, Msg1) to a network device. The network device sends a random access response (RAR) (namely, Msg2) to the terminal device based on the received preamble. Then, the terminal device performs uplink scheduling transmission (namely, Msg3) with the network device for the first time. Finally, the network device feeds back contention resolution (namely, Msg4) to the terminal device. It can be learned from the foregoing that an existing contention-based random access process is relatively complex and has a long access time and high signaling overheads.

SUMMARY

This application provides a random access method, apparatus, and device, and a storage medium, to simplify a random access process, reduce a delay, and reduce signaling overheads.

According to a first aspect, this application provides a communication method, including: sending a first message to a network device, where the first message includes first identification information scrambled by using an orthogonal cover code (OCC), and the first message is used by a terminal device corresponding to the first identification information to request random access to the network device; and receiving a second message sent by the network device, where the second message includes identification information of one or more terminal devices that succeed in random access, so that it can be determined, based on whether the identification information of the one or more terminal devices includes the first identification information, whether the random access succeeds.

Beneficial effects of this application include: This application provides a two-step random access method, to simplify a random access procedure, reduce an access delay of random access, and reduce signaling overheads. In addition, the first identification information of the terminal device is scrambled by using the OCC, to increase a possibility that first identification information of different terminal devices is different, thereby reducing a probability of a collision between the different terminal devices in a random access process, and increasing a capacity of a random access channel.

Optionally, the first message may further include a preamble sequence, and correspondingly, the second message further includes a timing advance TA that is generated by the network device based on the preamble sequence, to improve uplink synchronization accuracy.

Optionally, there is a mapping relationship between the preamble sequence and the OCC, or there is a mapping relationship between a frequency domain resource used to send the preamble sequence and a frequency domain resource used to send the first identification information. In this way, it is convenient for the network device to obtain the first message through detection, that is, when one of the preamble sequence and the first identification information is obtained through detection, the other can be obtained, to reduce complexity of blindly detecting, by the network device, the first message, and improve efficiency of receiving, by the network device, the first message.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, a random access radio network temporary identifier (RA-RNTI) of the terminal device is determined by using the OCC used to scramble the first identification information, to reduce a probability of a collision between RA-RNTIs.

Optionally, the RA-RNTI is determined by using the OCC used to scramble the first identification information, a sequence number of a frequency domain resource used to send the first message, and a sequence number of a time domain resource used to send the first message and/or a total quantity of OCCs available for the terminal device, to increase a possibility that RA-RNTIs determined by different terminal devices based on different OCCs are different, thereby reducing a probability of a collision between the RA-RNTIs.

Optionally, if an allocation manner of a frequency domain resource used to send the first message is an interlaced resource allocation manner, a sequence number of the frequency domain resource used to send the first message is a sequence number, of the frequency domain resource used to send the first message, in interlaced resource allocation.

Optionally, after the receiving a second message sent by the network device, the method further includes: if the identification information of the one or more terminal devices includes the first identification information, sending a third message to the network device, where the third message is used to indicate that the terminal device corresponding to the first identification information succeeds in the random access; or if the identification information of the one or more terminal devices does not include the first identification information, or the terminal device sending the first message fails to decode the second message, sending a fourth message to the network device, to enable the network device to resend the second message to the terminal device based on the fourth message, where the fourth message is used to indicate that the terminal device corresponding to the first identification information fails in the random access. In this way, sending the third message to the network device can avoid a resource waste caused because the network device sends the second message to the terminal device.

Sending the fourth message to the network device can enable the network device to resend the second message in time without waiting for preset duration, to effectively reduce a random access delay.

Optionally, the first message further includes a sequence number of the preamble sequence. In this way, when there is no mapping relationship between the preamble and the OCC, and the network device has not received the preamble in the first message, the network device may indicate, based on the sequence number of the preamble sequence, the terminal device to repeat the preamble.

Optionally, the first message further includes a sequence number of the preamble sequence and a sequence number of a frequency domain resource used to send the preamble sequence. In this way, when there is no mapping relationship between the preamble and the OCC, and the network device has not received the preamble in the first message, the network device may generate an RA-RNTI based on the received first identification information and the received sequence number of the frequency domain resource of the preamble sequence, and indicate, on a physical downlink control channel (PDCCH) scrambled by using the RA-RNTI, the terminal device corresponding to the sequence number of the preamble sequence to repeat the preamble, to ensure that the preamble is repeated.

Optionally, the sequence number of the preamble sequence and the first identification information are sent on a same time-frequency resource, or all of the sequence number of the preamble sequence, the first identification information, and the sequence number of the frequency domain resource used to send the preamble sequence are sent on a same time-frequency resource, to reduce a resource occupied by the first message.

Optionally, the first message further includes information about an optimal downlink transmit beam of the network device. For a high frequency system, efficiency of sending the second message can be improved.

Optionally, the second message further includes configuration information of a physical uplink control channel (PUCCH) used to send the third message or used to send the fourth message, so that the terminal device sends, based on the configuration information of the PUCCH in the second message, the third message or the fourth message on a resource indicated by the configuration information of the PUCCH, to prevent congestion from occurring when a plurality of terminal devices send third messages or fourth messages at the same time.

Optionally, the first identification information is a global unique network identifier S-TMSI of the terminal device, to reduce a probability of a collision between different terminal devices.

Optionally, if the terminal device is out of synchronization in the uplink and synchronized in the downlink, the first identification information is a cell radio network temporary identifier (C-RNTI) of the terminal device.

Optionally, if a time-frequency resource available for sending the first message is greater than a time-frequency resource occupied by the first message, the sending a first message to a network device includes: performing listen before talk (LBT) in a plurality of symbol locations in the time-frequency resource available for sending the first message, and sending the first message in the first symbol location in which LBT succeeds. In this way, a sending success rate of the first message can be increased.

Optionally, the receiving a second message sent by the network device includes: after receiving a PDCCH that is scrambled by using the RA-RNTI and that is sent by the network device, receiving, based on the PDCCH, the second message sent by the network device, to accurately receive the second message.

Optionally, the sending a first message to a network device includes: randomly selecting an OCC from a plurality of OCCs available for the terminal device, and scrambling the first identification information by using the selected OCC; and sending, to the network device on a randomly selected time-frequency resource used for random access, the first message carrying the scrambled first identification information. In this way, the first identification information is scrambled by using the randomly selected OCC, to increase a possibility that first identification information of different terminal devices is different, thereby reducing a probability of a collision between the terminal devices.

Optionally, the second message further includes a timing advance (TA), to improve uplink synchronization accuracy.

According to a second aspect, this application provides a random access method, including: receiving a first message sent by a terminal device, where the first message includes first identification information scrambled by using an OCC, and the first message is used by the terminal device corresponding to the first identification information to request random access to the network device; and sending a second message to the terminal device based on the first message, where the second message includes identification information of one or more terminal devices that succeed in random access, and the identification information of the one or more terminal devices includes the first identification information.

Beneficial effects of this application include: This application provides a two-step random access method, to simplify a random access procedure, reduce an access delay of random access, and reduce signaling overheads. In addition, the first identification information of the terminal device is scrambled by using the OCC, to increase a possibility that first identification information of different terminal devices is different, thereby reducing a probability of a collision between the different terminal devices in a random access process, and increasing a capacity of a random access channel.

Optionally, the first message further includes a preamble sequence, and the sending a second message to the terminal device based on the first message includes: generating a timing advance based on the preamble sequence; and sending the second message to the terminal device, where the second message includes the timing advance. In this way, uplink synchronization accuracy can be improved.

Optionally, there is a mapping relationship between the preamble sequence and the OCC, or there is a mapping relationship between a frequency domain resource used to send the preamble sequence and a frequency domain resource used to send the first identification information. In this way, it is convenient for the network device to obtain the first message through detection, and when one of the preamble sequence and the first identification information is obtained through detection, the other can be obtained, to reduce complexity of blindly detecting, by the network device, the first message, and improve efficiency of receiving, by the network device, the first message.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, if there is the mapping relationship between the preamble sequence and the OCC, the receiving a first message sent by the terminal device includes: blindly detecting a time-frequency resource used for random access, and detecting the preamble sequence; and receiving, based on the mapping relationship between the preamble sequence and the OCC, the first identification information scrambled by using the OCC. In this way, it is convenient for the network device to obtain the first message through detection, that is, when one of the preamble sequence and the first identification information is obtained through detection, the other can be obtained, to reduce complexity of blindly detecting, by the network device, the first message, and improve efficiency of receiving, by the network device, the first message.

Optionally, if there is the mapping relationship between the frequency domain resource used to send the preamble sequence and the frequency domain resource used to send the first identification information, the receiving a first message sent by the terminal device includes: blindly detecting a time-frequency resource used for random access, and obtaining, through detection, the frequency domain resource used to send the preamble sequence; and obtaining, based on the mapping relationship between the frequency domain resource used to send the preamble sequence and the frequency domain resource used to send the first identification information, the frequency domain resource used to send the first identification information, and receiving the first identification information on the frequency domain resource used to send the first identification information. In this way, when obtaining one frequency domain resource through detection, the network device may learn a location of the other frequency domain resource, and perform receiving in the location of the frequency domain resource, to reduce complexity of blindly detecting, by the network device, the first message, and improve efficiency of receiving, by the network device, the first message.

Optionally, the method further includes: determining a RA-RNTI of the terminal device based on the OCC used to scramble the first identification information, scrambling a PDCCH by using the RA-RNTI, and sending the second message to the terminal device on a time-frequency resource indicated by the scrambled PDCCH, to reduce a probability of a collision between RA-RNTIs.

Optionally, the determining a RA-RNTI of the terminal device based on the OCC used to scramble the first identification information includes: determining the RA-RNTI based on the OCC used to scramble the first identification information, a sequence number of a frequency domain resource used to send the first message, and a sequence number of a time domain resource used to send the first message and/or a total quantity of OCCs available for the terminal device. In this way, a possibility that RA-RNTIs determined by different terminal devices based on different OCCs are different can be further increased, to reduce a probability of a collision between the RA-RNTIs.

Optionally, if an allocation manner of the frequency domain resource used to send the first message is an interlaced resource allocation manner, the sequence number of the frequency domain resource used to send the first message is a sequence number, of the frequency domain resource used to send the first message, in interlaced resource allocation.

Optionally, after the sending a second message to the terminal device based on the first message, the method further includes: receiving a third message sent by the terminal device, where the third message is used to indicate that the terminal device corresponding to the first identification information succeeds in the random access; or receiving a fourth message sent by the terminal device, and resending the second message based on the fourth message, where the fourth message is used to indicate that the terminal device corresponding to the first identification information fails in the random access. In this way, sending the third message to the network device can avoid a resource waste caused because the network device sends the second message to the terminal device. Sending the fourth message to the network device can enable the network device to resend the second message in time without waiting for preset duration, to effectively reduce a random access delay.

Optionally, the first message further includes a sequence number of the preamble sequence. In this way, when there is no mapping relationship between the preamble and the OCC, and the network device has not received the preamble in the first message, the network device may indicate, based on the sequence number of the preamble sequence, the terminal device to repeat the preamble.

Optionally, the first message further includes a sequence number of the preamble sequence and a sequence number of a frequency domain resource used to send the preamble sequence. In this way, when there is no mapping relationship between the preamble and the OCC, and the network device has not received the preamble in the first message, the network device may generate an RA-RNTI based on the received first identification information and the received sequence number of the frequency domain resource of the preamble sequence, and indicate, on a PDCCH scrambled by using the RA-RNTI, the terminal device corresponding to the sequence number of the preamble sequence to repeat the preamble, to ensure that the preamble is repeated.

Optionally, the sequence number of the preamble sequence and the first identification information are sent on a same time-frequency resource, or all of the sequence number of the preamble sequence, the first identification information, and the sequence number of the frequency domain resource used to send the preamble sequence are sent on a same time-frequency resource, to reduce a resource occupied by the first message.

Optionally, the first message further includes information about an optimal downlink transmit beam of the network device. For a high frequency system, efficiency of sending the second message can be improved.

Optionally, the second message further includes configuration information of a PUCCH used to send the third message or used to send the fourth message, so that the terminal device sends, based on the configuration information of the PUCCH in the second message, the third message or the fourth message on a resource indicated by the configuration information of the PUCCH, to prevent congestion from occurring when a plurality of terminal devices send third messages or fourth messages at the same time.

Optionally, the first identification information is a global unique network identifier S-TMSI of the terminal device, to reduce a probability of a collision between different terminal devices.

Optionally, if the terminal device is out of synchronization in the uplink and synchronized in the downlink, the first identification information is a cell radio network temporary identifier C-RNTI of the terminal device.

The following provides several random access apparatuses and devices. Content and effects of the random access apparatuses and devices correspond to content and effects of the foregoing methods. The content and technical effects are not described below again.

According to a third aspect, this application provides a random access apparatus, including:
- a sending module, configured to send a first message to a network device, where the first message includes first identification information scrambled by using an OCC, and the first message is used by a terminal device corresponding to the first identification information to request random access to the network device;
- a receiving module, configured to receive a second message sent by the network device, where the second message includes identification information of one or more terminal devices that succeed in random access; and
- a processing module, configured to determine, based on whether the identification information of the one or more terminal devices includes the first identification information, whether the random access succeeds.

Optionally, the first message further includes a preamble sequence, and the second message further includes a timing advance that is generated by the network device based on the preamble sequence.

Optionally, there is a mapping relationship between the preamble sequence and the OCC, or there is a mapping relationship between a frequency domain resource used to send the preamble sequence and a frequency domain resource used to send the first identification information.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, the apparatus further includes: an RA-RNTI determining module, configured to determine a random access radio network temporary identifier RA-RNTI of the terminal device based on the OCC used to scramble the first identification information.

Optionally, the RA-RNTI determining module is specifically configured to determine the RA-RNTI based on the OCC used to scramble the first identification information, a sequence number of a frequency domain resource used to send the first message, and a sequence number of a time domain resource used to send the first message and/or a total quantity of OCCs available for the terminal device.

Optionally, if an allocation manner of a frequency domain resource used to send the first message is an interlaced resource allocation manner, a sequence number of the frequency domain resource used to send the first message is a sequence number, of the frequency domain resource used to send the first message, in interlaced resource allocation.

Optionally, the sending module is further configured to: if the identification information of the one or more terminal devices includes the first identification information, send a third message to the network device, where the third message is used to indicate that the terminal device corresponding to the first identification information succeeds in the random access; or if the identification information of the one or more terminal devices does not include the first identification information, or the second message fails to be decoded, send a fourth message to the network device, to enable the network device to resend the second message to the terminal device based on the fourth message, where the fourth message is used to indicate that the terminal device corresponding to the first identification information fails in the random access.

Optionally, the first message further includes a sequence number of the preamble sequence, or the first message further includes a sequence number of the preamble sequence and a sequence number of a frequency domain resource used to send the preamble sequence.

Optionally, the sequence number of the preamble sequence and the first identification information are sent on a same time-frequency resource, or all of the sequence number of the preamble sequence, the first identification information, and the sequence number of the frequency domain resource used to send the preamble sequence are sent on a same time-frequency resource.

Optionally, the first message further includes information about an optimal downlink transmit beam of the network device.

Optionally, the second message further includes configuration information of a PUCCH used to send the third message or used to send the fourth message.

Optionally, the first identification information is a global unique network identifier S-TMSI of the terminal device.

Optionally, if the terminal device is out of synchronization in the uplink and synchronized in the downlink, the first identification information is a C-RNTI of the terminal device.

Optionally, the sending module is further configured to: if a time-frequency resource available for sending the first message is greater than a time-frequency resource occupied by the first message, perform LBT in a plurality of symbol locations in the time-frequency resource available for sending the first message, and send the first message in the first symbol location in which LBT succeeds.

Optionally, the receiving module is specifically configured to: after receiving a PDCCH that is scrambled by using the RA-RNTI and that is sent by the network device, receive, based on the PDCCH, the second message sent by the network device.

Optionally, the processing module is further configured to: randomly select an OCC from a plurality of OCCs available for the terminal device, and scramble the first identification information by using the selected OCC; and
  the sending module is configured to send, to the network device on a randomly selected time-frequency resource used for random access, the first message carrying the scrambled first identification information.

According to a fourth aspect, this application provides a random access apparatus, including:
- a receiving module, configured to receive a first message sent by a terminal device, where the first message includes first identification information scrambled by using an OCC, and the first message is used by the terminal device corresponding to the first identification information to request random access to the network device; and
- a sending module, configured to send a second message to the terminal device based on the first message, where the second message includes identification information of one or more terminal devices that succeed in random access, and the identification information of the one or more terminal devices includes the first identification information.

Optionally, the first message further includes a preamble sequence, and the apparatus further includes:
- a timing advance generation module, configured to generate a timing advance based on the preamble sequence, where the sending module is further configured to send the second message to the terminal device, where the second message includes the timing advance.

Optionally, there is a mapping relationship between the preamble sequence and the OCC, or there is a mapping relationship between a frequency domain resource used to send the preamble sequence and a frequency domain resource used to send the first identification information.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, if there is the mapping relationship between the preamble sequence and the OCC, the receiving module is specifically configured to: blindly detect a time-frequency resource used for random access, detect the preamble sequence, and receive, based on the mapping relationship between the preamble sequence and the OCC, the first identification information scrambled by using the OCC.

Optionally, if there is the mapping relationship between the frequency domain resource used to send the preamble sequence and the frequency domain resource used to send the first identification information, the receiving module is specifically configured to: blindly detect a time-frequency resource used for random access, obtain, through detection, the frequency domain resource used to send the preamble sequence, obtain, based on the mapping relationship between the frequency domain resource used to send the preamble sequence and the frequency domain resource used to send the first identification information, the frequency domain resource used to send the first identification information, and receive the first identification information on the frequency domain resource used to send the first identification information.

Optionally, the apparatus further includes: an RA-RNTI determining module, configured to determine a RA-RNTI of the terminal device based on the OCC used to scramble the first identification information; and
   a scrambling module, configured to scramble a PDCCH by using the RA-RNTI, where
   the sending module is specifically configured to send the second message to the terminal device on a time-frequency resource indicated by the scrambled PDCCH.

Optionally, the RA-RNTI determining module is specifically configured to determine the RA-RNTI based on the OCC used to scramble the first identification information, a sequence number of a frequency domain resource used to send the first message, and a sequence number of a time domain resource used to send the first message and/or a total quantity of OCCs available for the terminal device.

Optionally, if an allocation manner of the frequency domain resource used to send the first message is an interlaced resource allocation manner, the sequence number of the frequency domain resource used to send the first message is a sequence number, of the frequency domain resource used to send the first message, in interlaced resource allocation.

Optionally, the receiving module is further configured to receive a third message sent by the terminal device, where the third message is used to indicate that the terminal device corresponding to the first identification information succeeds in the random access; or configured to receive a fourth message sent by the terminal device, where the fourth message is used to indicate that the terminal device corresponding to the first identification information fails in the random access; and
   the sending module is further configured to resend the second message to the terminal device based on the fourth message.

Optionally, the first message further includes a sequence number of the preamble sequence, or the first message further includes a sequence number of the preamble sequence and a sequence number of a frequency domain resource used to send the preamble sequence.

Optionally, the sequence number of the preamble sequence and the first identification information are sent on a same time-frequency resource, or
   all of the sequence number of the preamble sequence, the first identification information, and the sequence number of the frequency domain resource used to send the preamble sequence are sent on a same time-frequency resource.

Optionally, the first message further includes information about an optimal downlink transmit beam of the network device.

Optionally, the second message further includes configuration information of a PUCCH used to send the third message or used to send the fourth message.

Optionally, the first identification information is a global unique network identifier S-TMSI of the terminal device.

Optionally, if the terminal device is out of synchronization in the uplink and synchronized in the downlink, the first identification information is a C-RNTI of the terminal device.

According to a fifth aspect, this application provides a random access device, including:
   a transmitter, configured to send a first message to a network device, where the first message includes first identification information scrambled by using an OCC, and the first message is used by a terminal device corresponding to the first identification information to request random access to the network device;
   a receiver, configured to receive a second message sent by the network device, where the second message includes identification information of one or more terminal devices that succeed in random access; and
   a processor, configured to determine, based on whether the identification information of the one or more terminal devices includes the first identification information, whether the random access succeeds.

Optionally, the first message further includes a preamble sequence, and the second message further includes a timing advance that is generated by the network device based on the preamble sequence.

Optionally, there is a mapping relationship between the preamble sequence and the OCC, or there is a mapping relationship between a frequency domain resource used to send the preamble sequence and a frequency domain resource used to send the first identification information.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, the processor is further configured to determine a RA-RNTI of the terminal device based on the OCC used to scramble the first identification information.

Optionally, the processor is specifically configured to determine the RA-RNTI based on the OCC used to scramble the first identification information, a sequence number of a frequency domain resource used to send the first message, and a sequence number of a time domain resource used to send the first message and/or a total quantity of OCCs available for the terminal device.

Optionally, if an allocation manner of a frequency domain resource used to send the first message is an interlaced resource allocation manner, a sequence number of the frequency domain resource used to send the first message is a sequence number, of the frequency domain resource used to send the first message, in interlaced resource allocation.

Optionally, the transmitter is further configured to: if the identification information of the one or more terminal devices includes the first identification information, send a third message to the network device, where the third message is used to indicate that the terminal device corresponding to the first identification information succeeds in the random access; or if the identification information of the one or more terminal devices does not include the first identification information, or the second message fails to be decoded, send a fourth message to the network device, to enable the network device to resend the second message to the terminal device based on the fourth message, where the fourth message is used to indicate that the terminal device corresponding to the first identification information fails in the random access.

Optionally, the first message further includes a sequence number of the preamble sequence, or the first message further includes a sequence number of the preamble sequence and a sequence number of a frequency domain resource used to send the preamble sequence.

Optionally, the sequence number of the preamble sequence and the first identification information are sent on a same time-frequency resource, or
    all of the sequence number of the preamble sequence, the first identification information, and the sequence number of the frequency domain resource used to send the preamble sequence are sent on a same time-frequency resource.

Optionally, the first message further includes information about an optimal downlink transmit beam of the network device.

Optionally, the second message further includes configuration information of a PUCCH used to send the third message or used to send the fourth message.

Optionally, the first identification information is a global unique network identifier S-TMSI of the terminal device.

Optionally, if the terminal device is out of synchronization in the uplink and synchronized in the downlink, the first identification information is a cell radio network temporary identifier C-RNTI of the terminal device.

Optionally, the transmitter is further configured to: if a time-frequency resource available for sending the first message is greater than a time-frequency resource occupied by the first message, perform LBT in a plurality of symbol locations in the time-frequency resource available for sending the first message, and send the first message in the first symbol location in which LBT succeeds.

Optionally, the receiver is specifically configured to: after receiving a PDCCH that is scrambled by using the RA-RNTI and that is sent by the network device, receive, based on the PDCCH, the second message sent by the network device.

Optionally, the processor is configured to: randomly select an OCC from a plurality of OCCs available for the terminal device, and scramble the first identification information by using the selected OCC; and
    the transmitter is configured to send, to the network device on a randomly selected time-frequency resource used for random access, the first message carrying the scrambled first identification information.

According to a sixth aspect, this application provides a random access device, including:
    a receiver, configured to receive a first message sent by a terminal device, where the first message includes first identification information scrambled by using an OCC, and the first message is used by the terminal device corresponding to the first identification information to request random access to the network device; and
    a transmitter, configured to send a second message to the terminal device based on the first message, where the second message includes identification information of one or more terminal devices that succeed in random access, and the identification information of the one or more terminal devices includes the first identification information.

Optionally, the first message further includes a preamble sequence, and the device further includes a processor, where
    the processor is configured to generate a timing advance based on the preamble sequence; and
    the transmitter is further configured to send the second message to the terminal device, where the second message includes the timing advance.

Optionally, there is a mapping relationship between the preamble sequence and the OCC, or there is a mapping relationship between a frequency domain resource used to send the preamble sequence and a frequency domain resource used to send the first identification information.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, if there is the mapping relationship between the preamble sequence and the OCC, the receiver is specifically configured to: blindly detect a time-frequency resource used for random access, detect the preamble sequence, and receive, based on the mapping relationship between the preamble sequence and the OCC, the first identification information scrambled by using the OCC.

Optionally, if there is the mapping relationship between the frequency domain resource used to send the preamble sequence and the frequency domain resource used to send the first identification information, the receiver is specifically configured to: blindly detect a time-frequency resource used for random access, obtain, through detection, the frequency domain resource used to send the preamble sequence, obtain, based on the mapping relationship between the frequency domain resource used to send the preamble sequence and the frequency domain resource used to send the first identification information, the frequency domain resource used to send the first identification information, and receive the first identification information on the frequency domain resource used to send the first identification information.

Optionally, the processor is further configured to determine a RA-RNTI of the terminal device based on the OCC used to scramble the first identification information, and scramble a PDCCH by using the RA-RNTI; and the transmitter is specifically configured to send the second message to the terminal device on a time-frequency resource indicated by the scrambled PDCCH.

Optionally, the processor is specifically configured to determine the RA-RNTI based on the OCC used to scramble the first identification information, a sequence number of a frequency domain resource used to send the first message, and a sequence number of a time domain resource used to send the first message and/or a total quantity of OCCs available for the terminal device.

Optionally, if an allocation manner of the frequency domain resource used to send the first message is an interlaced resource allocation manner, the sequence number of the frequency domain resource used to send the first message is a sequence number, of the frequency domain resource used to send the first message, in interlaced resource allocation.

Optionally, the receiver is further configured to receive a third message sent by the terminal device, where the third message is used to indicate that the terminal device corresponding to the first identification information succeeds in the random access; or configured to receive a fourth message sent by the terminal device, where the fourth message is used to indicate that the terminal device corresponding to the first identification information fails in the random access; and the transmitter is further configured to resend the second message to the terminal device based on the fourth message.

Optionally, the first message further includes a sequence number of the preamble sequence, or the first message further includes a sequence number of the preamble sequence and a sequence number of a frequency domain resource used to send the preamble sequence.

Optionally, the sequence number of the preamble sequence and the first identification information are sent on a same time-frequency resource, or all of the sequence number of the preamble sequence, the first identification information, and the sequence number of the frequency domain resource used to send the preamble sequence are sent on a same time-frequency resource.

Optionally, the first message further includes information about an optimal downlink transmit beam of the network device.

Optionally, the second message further includes configuration information of a PUCCH used to send the third message or used to send the fourth message.

Optionally, the first identification information is a global unique network identifier S-TMSI of the terminal device.

Optionally, if the terminal device is out of synchronization in the uplink and synchronized in the downlink, the first identification information is a C-RNTI of the terminal device.

According to a seventh aspect, a random access device is provided, including:
  a memory, configured to store a computer program; and
  a processor, configured to execute the computer program, to implement the random access method according to the first aspect or the second aspect.

According to an eighth aspect, this application provides a computer storage medium, where the storage medium includes a computer instruction, and when the instruction is executed by a computer, the computer is enabled to implement the random access method according to either of the first aspect and the second aspect.

According to a ninth aspect, this application provides a computer program product, where the program product includes a computer program, the computer program is stored in a readable storage medium, at least one processor of a communications apparatus may read the computer program from the readable storage medium, and the at least one processor executes the computer program, to enable the communications apparatus to perform the random access method according to either of the first aspect and the second aspect.

According to the random access method, apparatus, and device, and the storage medium that are provided in this application, the terminal device scrambles the first identification information of the terminal device by using the OCC, and sends the first message to the network device, where the first message includes the scrambled first identification information. After receiving the first message sent by the terminal device, the network device sends the second message to the terminal device based on the first message, where the second message includes the identification information of the one or more terminal devices that succeed in random access, so that the terminal device can determine, based on whether the one or more terminal devices include the first identification information of this terminal device, whether this terminal device succeeds or fails in random access. To be specific, in the method, the first identification information of the terminal device is added to the first message, to implement two-step random access, thereby simplifying a random access procedure, reducing an access delay of random access, and reducing signaling overheads. In addition, the first identification information of the terminal device is scrambled by using the OCC, to increase a possibility that first identification information of different terminal devices is different, thereby reducing a probability of a collision between the different terminal devices in a random access process, and increasing a capacity of a random access channel.

DESCRIPTION OF EMBODIMENTS

Figure 1:
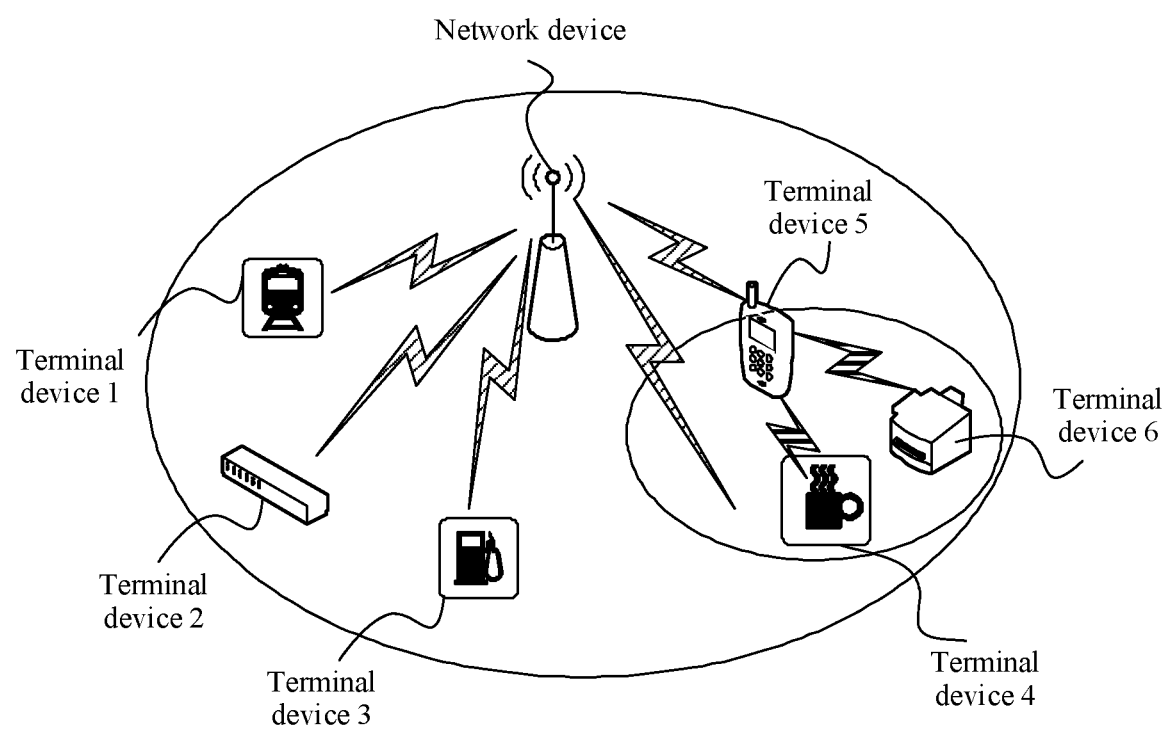
FIG. 1 is a schematic diagram of a communications system according to an embodiment of this application.

FIG. 1 is a schematic diagram of a communications system according to an embodiment of this application. As shown in FIG. 1, the communications system includes a network device and terminal devices.

In the following, some terms in this application are described, to help a person skilled in the art has a better understanding.

A network device is a device in a wireless network, for example, a radio access network (RAN) node that connects a terminal to the wireless network. Currently, examples of some RAN nodes are: a gNB, a transmission reception point (TRP), an evolved Node B (eNB), a radio network controller (RNC), a node B (NB), a base station controller (BSC), a base transceiver station (BTS), a home base station (for example, a home evolved NodeB, or a home Node B, HNB), a baseband unit (baseband unit, BBU), or a wireless fidelity (Wi-Fi) access point (AP). In a network structure, the network device may include a centralized unit (CU) node, a distributed unit (DU) node, or a RAN device including a CU node and a DU node. This is not limited herein.

A terminal device may be a wireless terminal device or a wired terminal device. The wireless terminal device may be a device having a wireless transceiver function, and may be deployed on land, for example, a device deployed indoors or outdoors, or a handheld or vehicle-mounted device; or may be deployed on water (for example, a ship); or may be deployed in the air (for example, on an airplane, a balloon, or a satellite). The terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self-driving, a wireless terminal device in remote medical, a wireless terminal device in a smart grid, a wireless terminal device in transportation safety, a wireless terminal device in a smart city, a wireless terminal device in a smart home, or the like. This is not limited herein. It may be understood that in this embodiment of this application, the terminal device may be alternatively referred to as user equipment (UE).

Technical solutions described in the embodiments of this application may be applied to various communications systems, for example, 2G, 3G, 4G, and 5G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems.

In the communications system shown in FIG. 1, in the following five scenarios, a terminal device needs to randomly access the network device:

Scenario 1: A radio resource control (RRC) connection is initially established. When UE switches from an idle mode to a connected mode, the UE initiates random access.

Scenario 2: An RRC connection is reestablished. After a radio link fails, the UE needs to reestablish an RRC connection. In this case, the UE initiates random access.

Scenario 3: During handover, the UE initiates random access in a target cell.

Scenario 4: Downlink data arrives. When UE is in a connected mode, and the network device needs to transmit downlink data to the UE, but finds that the UE is in an uplink out-of-synchronization state (the network device side maintains an uplink timer, and if the network device has not received a sounding reference signal of the UE when the uplink timer expires, the network device considers that the UE is out of synchronization in the uplink), the network device controls the UE to initiate random access.

Scenario 5: Uplink data arrives. When the UE is in a connected mode, and the UE needs to transmit uplink data to the network device, but finds that the UE is in an uplink out-of-synchronization state (the UE side maintains an uplink timer, and if the UE has not received a TA adjustment command of the network device when the uplink timer expires, the UE considers that the UE is out of synchronization in the uplink), the UE initiates random access.

Random access includes contention-based random access and non-contention-based random access. A random access method provided in the embodiments is for a contention-based random access process.

An existing contention-based random access process includes four steps: A terminal device sends a preamble (namely, Msg1) to a network device. The network device sends a random access response (RAR) (namely, Msg2) to the terminal device based on the received preamble. Then, the terminal device performs uplink scheduling transmission (namely, Msg3) with the network device for the first time. Finally, the network device feeds back contention resolution (namely, Msg4) to the terminal device. In other words, the existing contention-based random access process is relatively complex, and has a long access time, an access delay, and high signaling overheads.

To resolve the foregoing technical problems, the embodiments of this application provide a two-step random access method, to simplify a random access procedure, reduce an access delay of random access, and reduce signaling overheads. In addition, first identification information of a terminal device is scrambled by using an orthogonal cover code (OCC), to increase a possibility that first identification information of different terminal devices is different, thereby reducing a probability of a collision between the different terminal devices in a random access process, and increasing a capacity of a random access channel.

Figure 2:
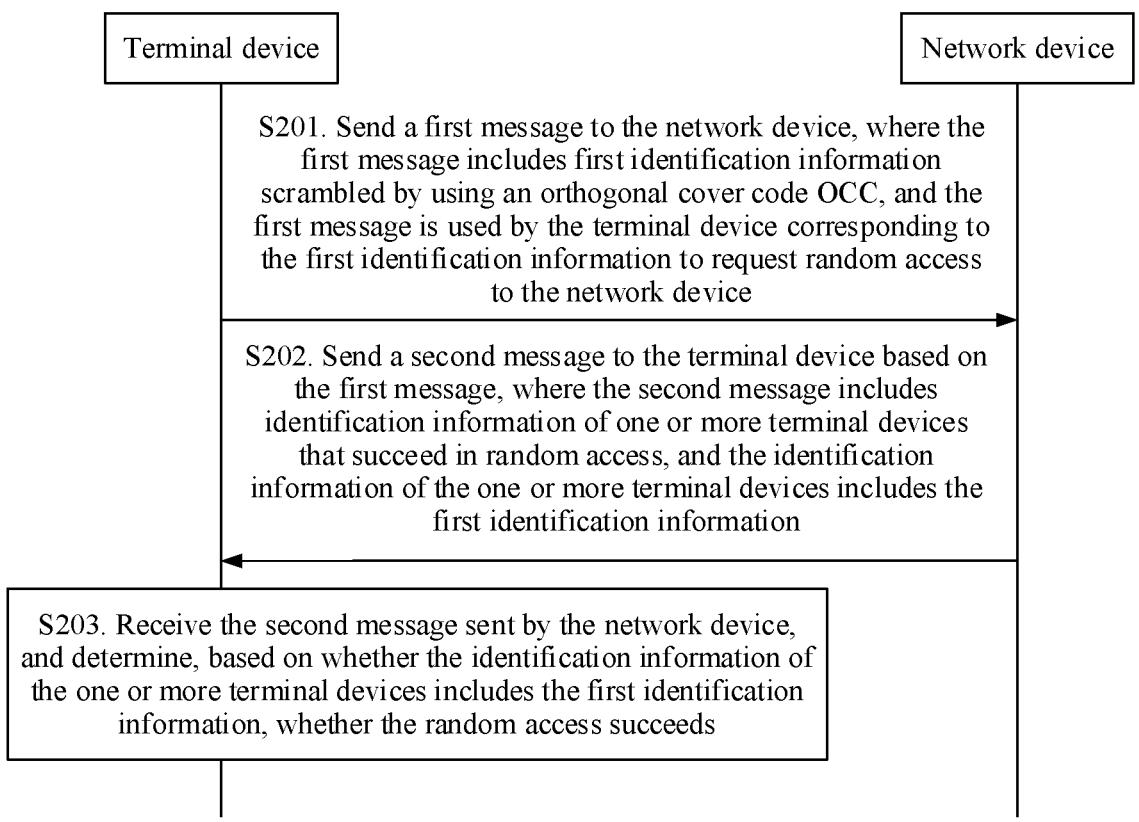
FIG. 2 is a flowchart of a random access method according to Embodiment 1 of this application.

FIG. 2 is a flowchart of a random access method according to Embodiment 1 of this application. As shown in FIG. 2, a two-step random access process in this embodiment includes the following steps.

S201. A terminal device sends a first message to a network device, where the first message includes first identification information scrambled by using an orthogonal cover code OCC, and the first message is used by the terminal device corresponding to the first identification information to request random access to the network device.

In this embodiment, when initiating a random access request to the network device, in other words, sending the first message to the network device, the terminal device directly adds the first identification information of the terminal device to the first message. However, in an existing random access process, a terminal device can send msg3 carrying first identification information of the terminal device to a network device only after two steps, that is, the terminal device sends a preamble sequence (preamble) to the network device and the network device configures a temporary network identifier for the terminal device. It can be learned that in this step, directly adding the first identification information of the terminal device to the first message can reduce random access steps, thereby reducing signaling overheads.

In some implementations, the first identification information of the terminal device may be a unique identifier of the terminal device or a temporary identifier of the terminal device.

In some other implementations, the first identification information of the terminal device may be a global unique network identifier (SAE-Temporary Mobile Subscriber Identity, S-TMSI) of the terminal device.

In some other implementations, the first identification information of the terminal device may be a network temporary identifier of the terminal device. For example, if the terminal device is out of synchronization in the uplink and synchronized in the downlink (namely, the foregoing scenario 4), the first identification information may be a cell radio network temporary identifier (C-RNTI) of the terminal device. The C-RNTI is determined when the terminal device is synchronized with the network device in the downlink.

In this embodiment, first identification information is scrambled by using an orthogonal cover code OCC, so that the scrambled first identification information is orthogonal to each other, to improve anti-interference performance in a process of transmitting the first identification information.

In addition, in this embodiment, different terminal devices may select different OCCs to scramble respective first identification information, to increase a possibility that the scrambled first identification information is different, thereby reducing a probability of a collision between the different terminal devices in a random access process.

For example, first identification information 1 of a terminal device 1 is the same as first identification information 2 of a terminal device 2, but OCCs selected by the terminal device 1 and the terminal device 2 are different. In this way, the first identification information 1 and the first identification information 2 that are scrambled by using the different OCCs are different. In this case, when the terminal device 1 and the terminal device 2 send first messages to the network device at the same time, the network device can accurately learn, through distinguishment based on the scrambled first identification information 1 and the scrambled first identification information 2 that are carried in the first messages, that two different terminal devices initiate random access requests, and further may separately allocate uplink access resources to the terminal device 1 and the terminal device 2, to increase a random access success rate of terminal devices having same first identification information, and increase a capacity of a random access channel.

In this embodiment, one terminal device may have a plurality of available OCCs. If an OCC used to scramble first identification information is configured by the network device, for example, configured by the network device in remaining minimum system information (RMSI) or other system information (OSI), the terminal device scrambles the first identification information by using the OCC specified by the network device.

In some embodiments, if the OCC used to scramble the first identification information is not configured by the network device, S201 may include S201a and S201b.

S201a: The terminal device randomly selects the OCC from a plurality of OCCs available for the terminal device, and scrambles the first identification information by using the selected OCC.

In this embodiment, a quantity and lengths of the OCCs corresponding to the terminal device may be provided in a standard, or may be configured by the network device in the RMSI or the OSI.

Optionally, a quantity of OCCs used to scramble the first identification information may be determined by a quantity of symbols needed for sending the first identification information. For example, if two symbols are needed for sending the first identification information, the quantity of OCCs used to scramble the first identification information is also 2. In an example, the two OCCs may be [+1, +1] and [+1, −1], or may be [+1, +1] and [−1, +1], or may be [−1, −1] and [−1, +1], or may be [−1, −1] and [+1, −1]. Optionally, the two OCCs may be alternatively orthogonal codes of other lengths.

The terminal device may randomly select the OCC from the plurality of available OCCs to scramble the first identification information of the terminal device. For example, the terminal device 1 selects the OCC [+1, −1] to scramble the first identification information of the terminal device 1, and the terminal device 2 selects the OCC [+1, +1] to scramble the first identification information of the terminal device 2. In this way, the scrambled two pieces of first identification information are orthogonal. When a plurality of terminal devices send first messages to the network device, first identification information carried in the first messages is orthogonal, to improve anti-interference performance between the first messages. In addition, a probability that a collision occurs when the plurality of terminal devices send the first messages can be reduced, and a capacity of a random access channel can be increased.

S201b. The terminal device sends, to the network device on a randomly selected time-frequency resource used for random access, the first message carrying the scrambled first identification information.

After the terminal device scrambles the first identification information according to the method in S201a, the terminal device randomly selects a slot (namely, a time domain resource) and a frequency domain resource that can be used for random access, and sends the first message carrying the scrambled first identification information to the network device in the slot and on the frequency domain resource, to implement sending of the first message.

S202. The network device sends a second message to the terminal device based on the first message, where the second message includes identification information of one or more terminal devices that succeed in random access, and the identification information of the one or more terminal devices includes the first identification information.

In this embodiment, when a plurality of terminal devices send random access requests to the network device, the network device has received, at the same time, first messages sent by the plurality of terminal devices. When the network device has received the first messages sent by the one or more terminal devices, it indicates that the one or more terminal devices succeed in random access. The network device parses the first messages sent by the one or more terminal devices, and descrambles first identification information that is scrambled by using OCCs and that is in the one or more first messages. Then, the network device allocates an uplink access resource to a terminal device corresponding to each piece of descrambled first identification information. Each allocated uplink resource and each piece of descrambled first identification information are added to the second message, and the second message is sent to the terminal device.

It can be learned from the foregoing that the second message in this embodiment includes the identification information of the one or more terminal devices that succeed in random access.

S203. The terminal device sending the first message receives the second message sent by the network device, and determines, based on whether the identification information of the one or more terminal devices includes the first identification information, whether the random access succeeds.

In this embodiment, after sending the first message, the terminal device listens to, in a time window, the second message sent by the network device.

If the terminal device has received the second message sent by the network device, the terminal device parses the second message, and determines whether the identification information of the one or more terminal devices that is carried in the second message includes the first identification information of the terminal device. If the identification information includes the first identification information of the terminal device, the current random access succeeds. If the second message does not include the first identification information of this terminal device, it is determined that the current random access fails.

Optionally, when the terminal device sending the first message has not received, within a preset time, the second message sent by the network device, the terminal device determines that current the random access fails, and the terminal device may adjust an uplink transmit power, and resend the first message to the network device by using an adjusted uplink transmit power.

In this embodiment, the identification information of the terminal device that succeeds in the random access is directly added to the second message. In this way, the terminal device can determine, based on whether the second message includes the first identification information of the terminal device, whether the random access succeeds. The random access process is simple and can be completed in only two steps. In a machine type communication (MTC) or ultra-reliable low-latency communications (URLLC) scenario, a delay can be effectively reduced and signaling overheads can be reduced.

In the random access process provided in this embodiment, the terminal device scrambles the first identification information of the terminal device by using the OCC, and sends the first message to the network device, where the first message includes the scrambled first identification information. After receiving the first message sent by the terminal device, the network device sends the second message to the terminal device based on the first message, where the second message includes the identification information of the one or more terminal devices that succeed in random access, so that the terminal device sending the first message can determine, based on whether the one or more terminal devices include the first identification information of this terminal device, whether this terminal device succeeds or fails in the random access. To be specific, in this embodiment, the first identification information of the terminal device is added to the first message, to implement two-step random access, thereby simplifying a random access procedure, reducing an access delay of random access, and reducing signaling overheads. In addition, the first identification information of the terminal device is scrambled by using the OCC, to increase a possibility that first identification information of different terminal devices is different, thereby reducing a probability of a collision between the different terminal devices in a random access process, and increasing a capacity of a random access channel.

In some possible implementations, after S203, the method in this embodiment further includes the following steps.

S204a. If the identification information of the one or more terminal devices includes the first identification information, the terminal device sends a third message to the network device, where the third message is used to indicate that the terminal device corresponding to the first identification information succeeds in the random access.

S204b. The network device receives the third message sent by the terminal device sending the first message.

Alternatively, in other implementations, after S203, the method in this embodiment further includes the following steps.

S204c. If the identification information of the one or more terminal devices does not include the first identification information of the terminal device sending the first message, or the terminal device sending the first message fails to decode the second message, the terminal device sending the first message sends a fourth message to the network device, to enable the network device to resend the second message based on the fourth message, where the fourth message is used to indicate that the terminal device corresponding to the first identification information (namely, the terminal device sending the first message) fails in the random access.

S204d. The network device receives the fourth message sent by the terminal device sending the first message, and resends the second message based on the fourth message.

In an existing random access process, after a network device sends a message to a terminal device, if the network device has not received a response message of the terminal device within preset duration, the network device may resend the message to the terminal device.

Based on the foregoing reason, during actual use of an existing random access method, if the terminal device succeeds in the random access, and the network device sends the second message to the terminal device after preset duration, a waste of a random access resource is caused. If the terminal device fails in the random access, the terminal device needs to wait for preset duration before receiving the second message resent by the network device, leading to a random access delay. To resolve the foregoing problem, in this embodiment, after receiving the second message sent by the network device, the terminal device sends a response message to the network device in time, to reduce a random access delay and prevent a waste of a random access resource.

Specifically, after receiving the second message sent by the network device, the terminal device sending the first message parses the second message, and determines whether the identification information that is of the one or more terminal devices succeeding in random access and that is included in the second message includes the first identification information of this terminal device.

If the identification information of the one or more terminal devices that is included in the second message includes the first identification information of this terminal device, the terminal device sends the third message (for example, a hybrid automatic repeat request acknowledgement (HARQ ACK)) to the network device, where the third message is used to indicate that the terminal device corresponding to the first identification information succeeds in the random access. After receiving the third message, the network device stops sending the second message to the terminal device sending the first message, to prevent a waste of a random access resource.

Due to an impact of an external factor, for example, electromagnetic interference, or unstable working of a transmitter or a receiver, the second message fails to be sent and the terminal device has not received the second message, or the second message changes in a sending, transmission, and receiving process. In this case, the terminal device may send the fourth message (for example, a hybrid automatic repeat request negative acknowledgement (HARQ NACK)) to the network device, so that the network device resends the second message to the terminal device. Specifically, if the identification information of the one or more terminal devices that is included in the second message does not include the first identification information of this terminal device, or the terminal device has not received the second message, the terminal device sends the fourth message to the network device, where the fourth message is used to indicate that the terminal device corresponding to the first identification information fails in the random access. After receiving the fourth message, the network device resends the second message to the terminal device. In this way, a problem that the random access fails because the second message fails to be sent can be resolved. In addition, the terminal device actively sends the fourth message to the network device to enable the network device to resend the second message in time without waiting for preset duration, to effectively reduce a random access delay.

Optionally, in this embodiment, if the identification information of the one or more terminal devices that is included in the second message still does not include the first identification information of this terminal device after the network device sends the second message to the terminal device for a preset quantity of times (for example, three times), it is determined that this terminal device fails in the random access.

In this embodiment, after receiving the fourth message sent by the terminal device, the network device resends the second message to the terminal device as described above. Optionally, if the network device has received the fourth message sent by the terminal device and a third message sent by another terminal device, it indicates that the terminal device sending the third message succeeds in access, that is, a process of sending the second message is normal, but a conflict occurs. To prevent a waste of a random access resource, the network device does not resend the second message to the terminal device. Optionally, the second message in this embodiment further includes configuration information of a PUCCH used to send the third message or used to send the fourth message.

In actual application, when a plurality of terminal devices send third messages or fourth messages to the network device at the same time, a PUCCH configured by a system for sending a third message or a fourth message may not be able to carry the third messages or the fourth messages of all the terminal devices. In this case, the network device in this embodiment adds, to the second message, configuration information of the PUCCH used to send the third message or the fourth message, so that the terminal devices send, based on the configuration information of the PUCCH in the second message, the third messages or the fourth messages on a resource indicated by the configuration information of the PUCCH, to prevent congestion during sending of the third messages or the fourth messages, and ensure that the network device can receive the third messages or the fourth messages of all the random access terminal devices.

The configuration information of the PUCCH may include at least one of a time domain location, a frequency domain location, and a used cyclic shift (cyclic shift) value.

Figure 3:
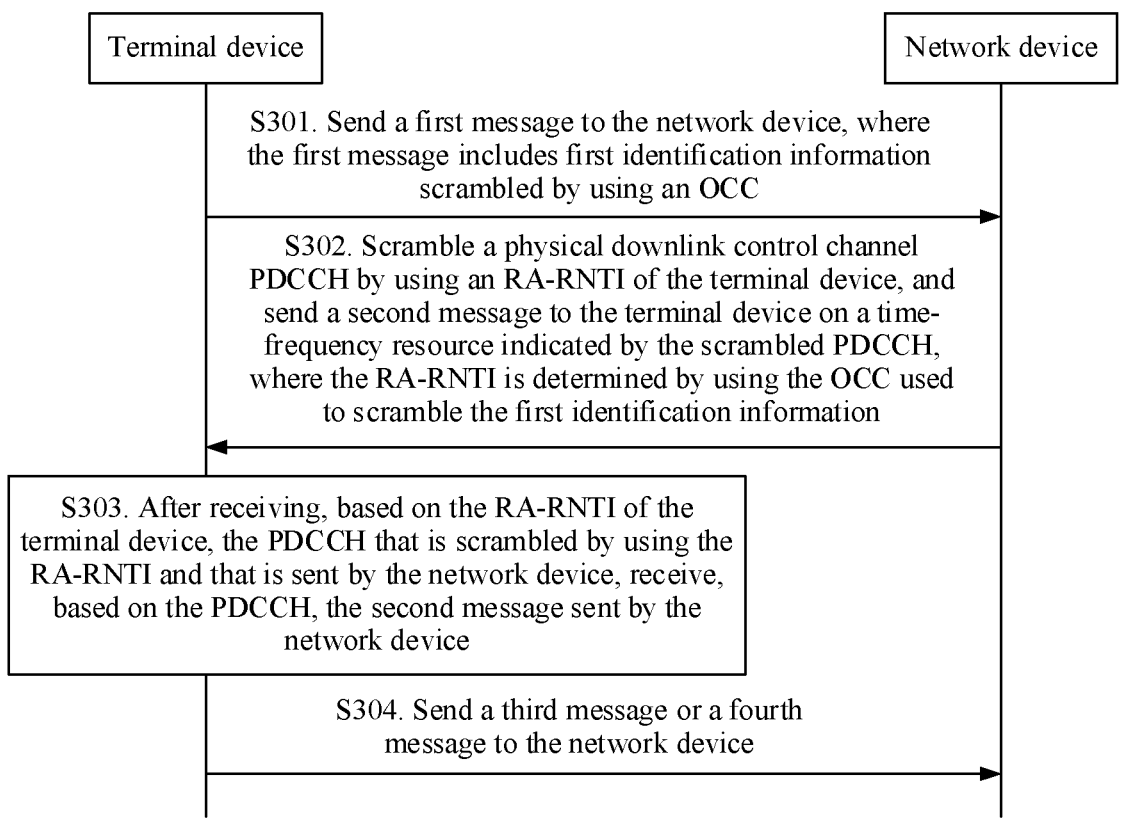
FIG. 3 is an interaction flowchart of a random access method according to Embodiment 2 of this application.

FIG. 3 is an interaction flowchart of a random access method according to Embodiment 2 of this application. Based on the foregoing embodiment, as shown in FIG. 3, the random access method in this embodiment may include the following steps.

S301. A terminal device sends a first message to a network device, where the first message includes first identification information scrambled by using an OCC.

S302. The network device scrambles a PDCCH by using an RA-RNTI of the terminal device, and sends a second message to the terminal device on a time-frequency resource indicated by the scrambled PDCCH, where the RA-RNTI of the terminal device is determined by using the OCC used to scramble the first identification information.

S303. After receiving, based on the RA-RNTI of the terminal device sending the first message, the PDCCH that is scrambled by using the RA-RNTI and that is sent by the network device, the terminal device receives, based on the PDCCH, the second message sent by the network device.

In some implementations, the terminal device sends the first message to the network device, and before receiving the second message, determines the RA-RNTI of the terminal device by using the OCC used to scramble the first identification information.

In addition, the network device blindly detects the first message by using all possible OCCs and on each frequency domain resource (for example, each interlace) in each slot used for random access. When obtaining the first message through detection, the network device may obtain the OCC used to scramble the first message. The network device determines, by using the OCC used to scramble the first message, the RA-RNTI of the terminal device sending the first message. Then, after scrambling the PDCCH by using the RA-RNTI, the network device sends the second message to the terminal device sending the first message, on the time-frequency resource that is indicated by the scrambled PDCCH and that is used to send the second message. The PDCCH carries the RA-RNTI.

The terminal device sending the first message continuously listens to, in a time window based on the RA-RNTI of the terminal device, the PDCCH that is scrambled by using the RA-RNTI and that is sent by the network device. After obtaining, through detection in the time window, the PDCCH scrambled by using the RA-RNTI of the terminal device, the terminal device decodes the second message carried on the time-frequency resource indicated by the PDCCH, to accurately receive the second message.

A process in which the terminal device determines the RA-RNTI is the same as a process in which the network device determines the RA-RNTI. The following provides description by using an example in which the terminal device determines the RA-RNTI.

In an existing random access method, an RA-RNTI of a terminal device by using formula (1):

$$\text{RA-RNTI} = 1 + t\_id + 10 * f\_id \qquad (1), \text{where}$$

t_id (0≤t_id<10) is a subframe number of a random access slot, and f_id (0≤f_id<6) is a frequency domain number of the random access slot.

It can be learned from the foregoing formula (1) that when values of t_id randomly selected by different terminal devices are the same and values of f_id randomly selected by the different terminal devices are the same, RA-RNTIs of the different terminal devices are the same, leading to a collision between the RA-RNTIs. When subsequently receiving the second message, the terminal device cannot accurately receive the second message corresponding to the RA-RNTI of the terminal device, leading to a random access failure.

To reduce a probability of a collision between RA-RNTIs, the RA-RNTI of the terminal device in this embodiment is determined by using the OCC used to scramble the first identification information, so that the RA-RNTI changes with different OCCs.

Optionally, in this embodiment, the RA-RNTI of the terminal device is determined by using a quantity of OCCs and/or a number of the OCC used to scramble the first identification information.

For example, there are two OCCs, namely, [+1, +1] and [+1, −1], available for the terminal device. A number of the OCC [+1, +1] is $Idx_{OCC}=0$, and a number of the OCC [+1, +1] is $Idx_{OCC}=1$. It is assumed that the terminal device selects the OCC [+1, −1] to scramble the first identification information of this terminal device. In this case, the RA-RNTI of the terminal device may be determined by using a total quantity (for example, 2) of the OCCs available for this terminal device. Alternatively, the RA-RNTI of this terminal device is determined by using a number (for example, 1) of the OCC used to scramble the first identification information. Alternatively, the RA-RNTI of this terminal device is determined by using a total quantity of OCCs available for the terminal device and a number of the OCC used to scramble the first identification information.

In this embodiment, total quantities of OCCs available for different terminal devices may be different, and numbers of OCCs that are selected by the terminal devices from a plurality of OCCs to scramble first identification information may also be different, to increase a possibility that RA-RNTIs determined by different terminal devices based on different OCCs are different, thereby reducing a probability of a collision between RA-RNTIs.

In some implementations, the RA-RNTI of the terminal device may be determined by using the OCC used to scramble the first identification information and a frequency domain resource used to send the first message.

For example, the RA-RNTI of the terminal device is determined by using the number of the OCC used to scramble the first identification information and the frequency domain resource used to send the first message. As shown in formula (2), formula (2) is merely an example, and an implementation of this embodiment is not limited to formula (2):

$$RA\text{-}RNTI=1+10*(f\_id+Idx_{OCC}) \quad (2), \text{where}$$

f_id is a sequence number of the frequency domain resource used to send the first message (namely, a subframe number of a random access slot), and $Idx_{OCC}$ is the number of the OCC selected by the terminal device to scramble the first identification information.

Alternatively, the RA-RNTI of the terminal device is determined by using the total quantity of OCCs available for the terminal device and a frequency domain resource used to send the first message. As shown in formula (3), formula (3) is merely an example, and an implementation of this embodiment is not limited to formula (3):

$$RA\text{-}RNTI=1+10*(N_{OCC}*f\_id) \quad (3), \text{where}$$

$N_{OCC}$ is the total quantity of OCCs available for the terminal device.

In this way, the RA-RNTI is determined by using the OCC and the frequency domain resource that is used to send the first message, to further reduce a probability of a collision between RA-RNTIs. For example, OCCs selected by a terminal device 1 and a terminal device 2 to scramble respective first identification information are the same, but frequency domain resources selected by the terminal device 1 and the terminal device 2 to send first messages are different. Therefore, RA-RNTIs of the terminal device 1 and the terminal device 2 that are obtained according to formula (2) are different, to prevent a collision between the RA-RNTIs of the two devices. Alternatively, OCCs available for a terminal device 1 and a terminal device 2 are the same, but frequency domain resources selected by the terminal device 1 and the terminal device 2 to send first messages are different. Therefore, RA-RNTIs of the terminal device 1 and the terminal device 2 that are obtained according to formula (3) are different, to prevent a collision between the RA-RNTIs of the two devices.

In some possible implementations, the RA-RNTI of the terminal device may be determined by using the OCC used to scramble the first identification information, a sequence number of a frequency domain resource used to send the first message, and a sequence number of a time domain resource used to send the first message and/or the total quantity of OCCs available for the terminal device. The total quantity of OCCs available for the terminal device is the same as a quantity of symbols included in the time domain resource used to send the first message.

The total quantity of OCCs available for the terminal is greater than or equal to the quantity of symbols included in the time domain resource used to send the first message. In an example, the RA-RNTI of the terminal device is determined by using the number of the OCC used to scramble the first identification information, the sequence number of the frequency domain resource used to send the first message, and the sequence number of the time domain resource used to send the first message. For example, as shown in formula (4), formula (4) is merely an example, and an implementation of this embodiment is not limited to formula (4):

$$RA\text{-}RNTI=1+t\_id+10*(f\_id+Idx_{OCC}) \quad (4), \text{where}$$

t_id is the sequence number of the time domain resource used to send the first message.

In another example, the RA-RNTI of the terminal device is determined by using the number of the OCC used to scramble the first identification information, the sequence number of the frequency domain resource used to send the first message, and the total quantity of OCCs available for the terminal device. For example, as shown in formula (5), formula (5) is merely an example, and an implementation of this embodiment is not limited to formula (5):

$$RA\text{-}RNTI=1+10*(N_{OCC}*f\_id+Idx_{OCC}) \quad (5), \text{where}$$

In still another example, the RA-RNTI is determined by using the number of the OCC used to scramble the first identification information, the sequence number of the frequency domain resource used to send the first message, the sequence number of the time domain resource used to send the first message, and the total quantity of OCCs available for the terminal device. For example, as shown in formula (6), formula (6) is merely an example, and an implementation of this embodiment is not limited to formula (6):

$$RA\text{-}RNTI = 1 + t\_id + 10 * (N_{OCC} * f\_id + Idx_{OCC}) \quad (6), \text{ where}$$

In this embodiment, a probability that time-frequency resources selected by different terminal devices to send first messages are the same and OCCs selected by the different terminal devices are the same is greatly reduced, and determining the RA-RNTI based on the number of the OCC, the sequence number of the frequency domain resource used to send the first message, and the sequence number of the time domain resource used to send the first message and/or the total quantity of OCCs available for the terminal device can effectively reduce a probability of a collision between RA-RNTIs.

Optionally, in this embodiment, if an allocation manner of the frequency domain resource used to send the first message is an interlaced resource allocation manner, the sequence number of the frequency domain resource used to send the first message is a sequence number, of the frequency domain resource used to send the first message, in interlaced resource allocation.

Figure 4:
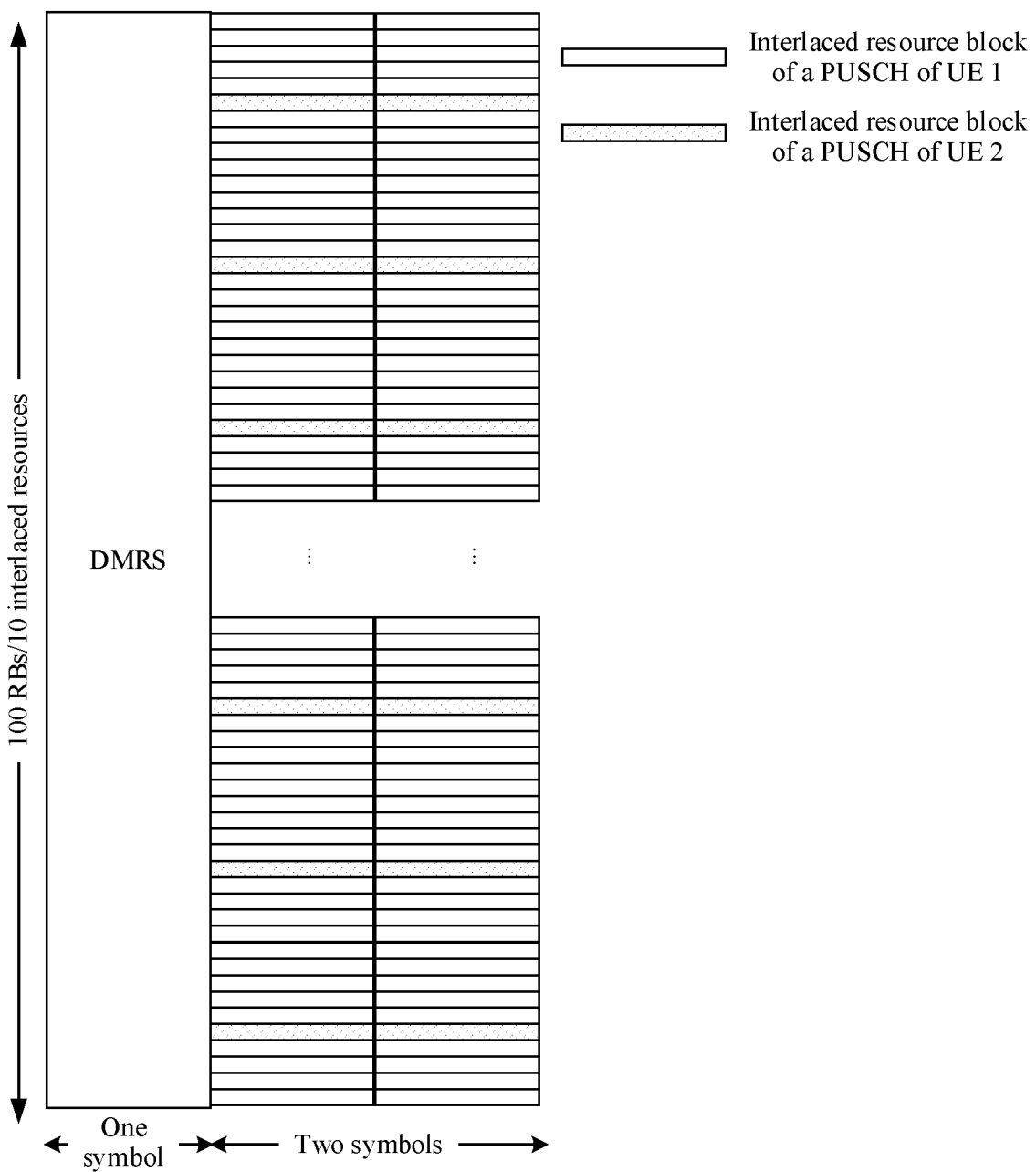
FIG. 4 is a schematic diagram of allocating a resource used to send a first message according to Embodiment 2 of this application.

For example, if a frequency band used to transmit the first message in this embodiment is an unlicensed frequency band, data transmission on the unlicensed frequency band imposes requirements on a ratio of a transmission bandwidth to a channel bandwidth and on a transmit power limit (a maximum power allowed per MHz). To obtain a higher transmission power and meet a transmission bandwidth requirement, the terminal device performs uplink transmission in an interlaced (interlace) resource allocation manner. As shown in FIG. 4, a 20 MHz channel bandwidth includes 106 resource blocks (Resource Block, RB). 100 RBs in the 106 RBs are divided into 10 parts, and each part is used as one interlace. An interlace includes a specific quantity of RBs distributed at intervals in an entire transmission bandwidth. RBs allocated to a terminal device are not consecutive, but have a same interval or different intervals. In other words, in an interlace allocated to a terminal device, RBs may be distributed at equal intervals or distributed at non-equal intervals.

If RBs in an interlace are distributed at equal intervals, each interlace includes 10 RBs. The terminal device may use one or more interlaces to perform uplink transmission (and to send the first message). For example, if the terminal device selects an interlace 0 to send the first message, the terminal device performs transmission on RBs 0, 10, 20, . . . , and 90. For example, if the terminal device selects an interlace 5 to send the first message, the terminal device performs transmission on RBs 5, 15, 25, . . . , and 95.

If RBs in an interlace are distributed at non-equal intervals and a channel occupation proportion requirement is met, the interlace may also be used to send the first message. For example, the terminal device may perform transmission on an interlace 0, and the interlace 0 includes RBs 0, 15, 20, 35, 40, 65, 70, 75, 85, and 90. An RB mapping manner of an interlace may be provided in a standard, or may be flexibly configured by the network device and indicated in RMSI/OSI or other system information.

It can be learned from the foregoing that if the allocation manner of the frequency domain resource used to send the first message is the interlaced allocation manner, the sequence number of the frequency domain resource used to send the first message in the foregoing formulas is a sequence number of a selected interlace used to send the first message. For example, the sequence number of the frequency domain resource selected by the terminal device to send the first message is 5, and a frequency domain resource corresponding to an interlace 5 is RBs 5, 15, . . . , and 95. In this way, the terminal device may send the first message on the frequency domain resource: RBs 5, 15, 25, . . . , and 95.

In this embodiment, if the frequency band used to transmit the first message is an unlicensed frequency band, to ensure that is terminal device coexists with another device working on the unlicensed frequency band, a LBT channel contention access mechanism is used. However, the random access method in this embodiment includes two steps, and LBT needs to be performed only twice, to reduce a quantity of times of LBT, thereby further reducing a random access delay.

For example, the first message lasts for 13 symbols, and is mapped to the last 13 symbols in one 14-symbol slot, and the first symbol is used to perform LBT.

Optionally, in this embodiment, if a time-frequency resource available for sending the first message is greater than a time-frequency resource occupied by the first message, S301 may include:

performing LBT in a plurality of symbol locations in the time-frequency resource available for sending the first message, and sending the first message in the first symbol location in which LBT succeeds.

For example, if the first message lasts for 13 symbols, and a length of a time window used to send the first message is 27 symbols, the terminal device may attempt to send the first message in a plurality of symbol locations, to increase a sending success probability of the first message. For example, the terminal device performs LBT in symbol 1, and if LBT succeeds, the terminal device sends the first message in symbols 2 to 14, or if LBT fails, the terminal device performs LBT in symbol 2, and sends the first message in symbols 3 to 15 if LBT succeeds. By analogy, the terminal device may send the first message on a time domain resource including 13 consecutive symbols that are in symbols 1-14, symbols 2-15, . . . , and symbols 14-27 and that follow a symbol in which LBT succeeds for the first time, to increase a sending success probability of the first message, and improve timely sending of the first message.

In some implementations, this embodiment may further include S304.

S304. The terminal device sending the first message sends a third message or a fourth message to the network device.

After receiving the second message according to the foregoing steps, the terminal device sending the first message parses the second message, and if the identification information of the terminal device carried in the second message is consistent with the first identifier of this terminal device, sends, to the network device, the third message indicating that random access succeeds.

If the identification information of the terminal device carried in the second message is inconsistent with the first identification information of this terminal device, or the terminal device sending the first message has not received, within the time window, the second message sent by the network device, the terminal device sends the fourth message to the network device, to enable the network device to resend the second message to the terminal device. For a specific process, refer to the descriptions of the foregoing embodiments, and details are not described herein again.

In the random access method provided in this embodiment, the RA-RNTI of the terminal device is determined based on the OCC used to scramble the first identification information. Because OCCs selected by different terminal devices may be different, determining the RA-RNTIs based on the OCCs can increase a possibility that RA-RNTIs of the different terminal devices are different, thereby reducing a probability of a collision between the RA-RNTIs.

FIG. 4 is an interaction flowchart of a random access method according to Embodiment 3 of this application. A first signal in this embodiment includes first identification information but does not include a preamble sequence (Preamble), and a random access process in this embodiment may include the following steps.

S501. A terminal device sends a first message to a network device, where the first message includes first identification information scrambled by using an OCC, and does not include a preamble.

S502. The network device scrambles a PDCCH by using an RA-RNTI of the terminal device, and sends the second message to the terminal device on a time-frequency resource indicated by the scrambled PDCCH, where the RA-RNTI is determined by using the OCC used to scramble the first identification information.

S503. After receiving the PDCCH that is scrambled by using the RA-RNTI and that is sent by the network device, the terminal device sending the first message receives, based on the PDCCH, the second message sent by the network device.

S504. The terminal device sending the first message sends a third message or a fourth message to the network device.

In a small cellular scenario, duration of an entire preamble is two symbols. When a PRACH uses a 15 KHz subcarrier spacing (SCS), the duration of the entire preamble is 0.14 ms.

A length of a cyclic prefix (CP) corresponding to the 15 KHz subcarrier spacing is 144 Ts, namely, 4.68 μs. A transmission delay of about 6.7 μs is generated for a cellular cell with a radius of 1 km. Therefore, the 4.68 μs CP may correspond to a cell radius of about 700 meters.

It can be learned from the foregoing that when a cell radius is less than or equal to 700 meters, a CP with a 15 KHz subcarrier spacing can eliminate an impact caused by a transmission delay on signal receiving. Based on the foregoing reason, assuming that an impact caused by an uplink transmission time error on the receive side is not considered for the cell, the terminal device does not need to send a preamble for the network device to estimate an uplink time error of the terminal device. In this case, the terminal device adds the first identification information of the terminal device to the first message, and does not need to add the preamble. In this way, a resource used to send the first message can be reduced, and a delay caused when the terminal device selects the preamble can be avoided.

It should be noted that in this embodiment, the first message includes only the first identification information of the terminal device sending the first message. Therefore, a sequence number that is of a frequency domain resource used to send the first message and that is used to calculate the RA-RNTI is a sequence number of a frequency domain resource used to send the first identification information, and a sequence number that is of a time domain resource used to send the first message and that is used to calculate the RA-RNTI is a sequence number of a time domain resource used to send the first identification information.

Figure 5:
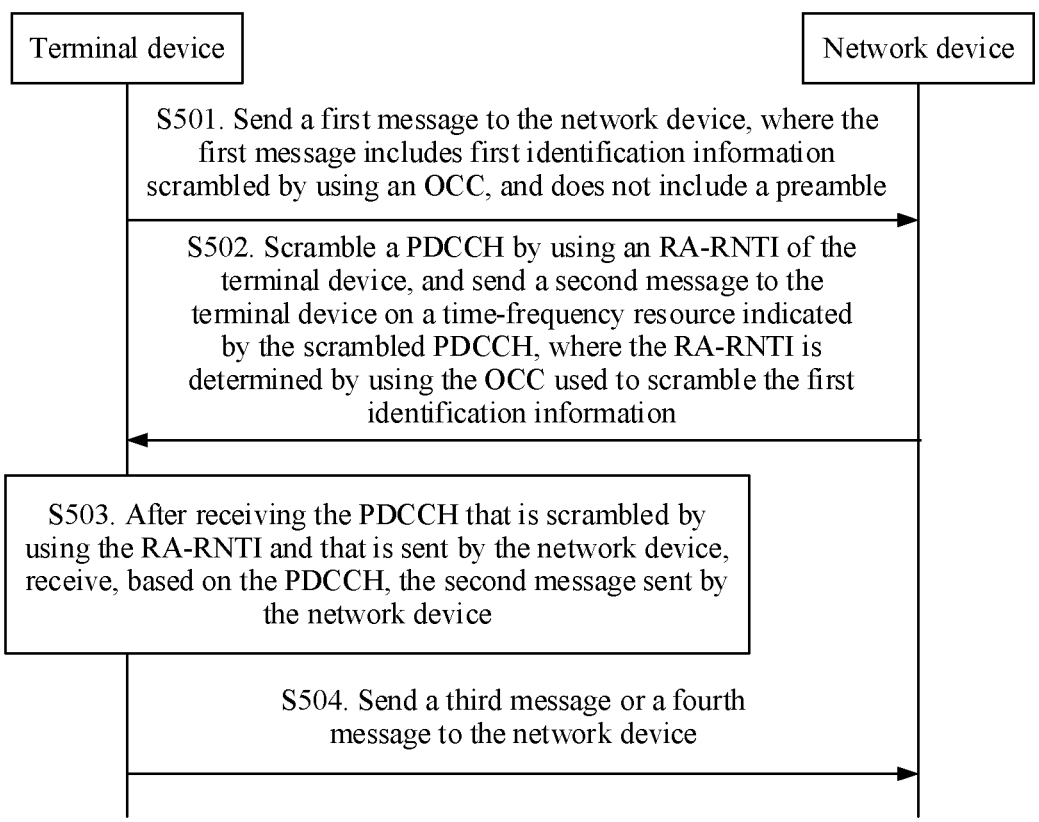
FIG. 5 is an interaction flowchart of a random access method according to Embodiment 3 of this application.

Optionally, in this embodiment, as shown in FIG. 5, a demodulation reference signal (DMRS) may be carried on the first one or more symbols in a symbol used to send the first message, and the DMRS is used for uplink channel estimation.

Optionally, the DMRS may be alternatively carried on a middle symbol in an uplink channel.

In the random access method provided in this embodiment, the first message includes only the first identification information of the terminal device, but does not include the preamble. In this way, a resource used to send the first message can be reduced, and a delay caused when the terminal device selects the preamble can be avoided.

Figure 6:
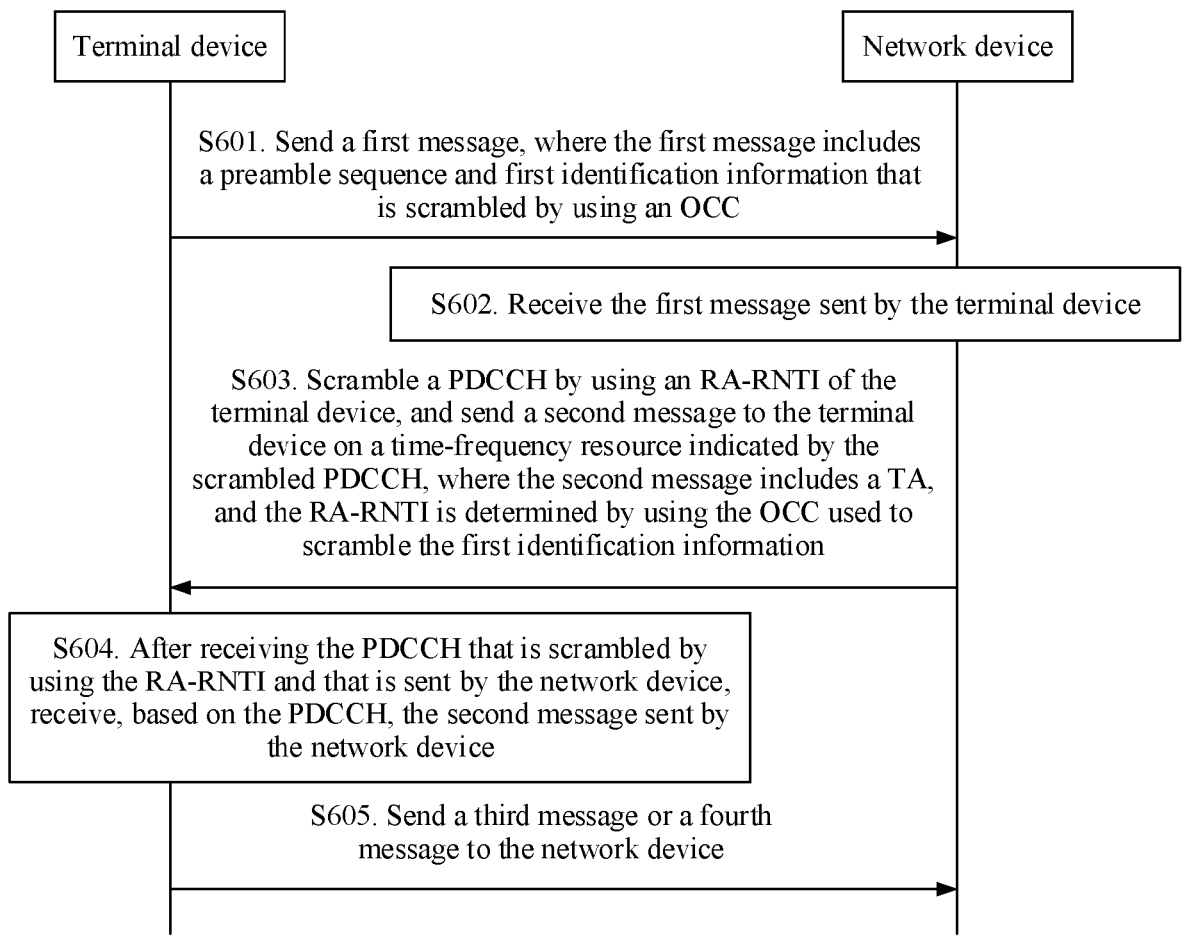
FIG. 6 is a flowchart of a random access method according to Embodiment 3 of this application.

FIG. 6 is a flowchart of a random access method according to Embodiment 3 of this application. A first signal in this embodiment includes first identification information and a preamble sequence, and a random access process in this embodiment may include the following steps.

S601. A terminal device sends a first message to a network device, where the first message includes a preamble sequence and first identification information that is scrambled by using an OCC.

In some application scenarios, signal propagation needs time, and signals sent by terminal devices at different locations arrive at the network device at different times. As a result, signals of the different terminal devices are asynchronous, and interference is caused because orthogonal frequency division multiplexing (OFDM) symbols are not orthogonal.

To ensure that uplink signals arrive at a network device synchronously, terminal devices at different distances need to use different timing advances to send information.

Therefore, in this embodiment, the first message includes the preamble, where the preamble is used for the network device to evaluate a timing advance of the terminal device, to improve uplink synchronization accuracy. In addition, precise uplink synchronization helps to perform data transmission between the network device and the terminal device by using a higher modulation and coding scheme (MCS).

In some implementations, there is a mapping relationship between the preamble and the OCC. In this way, the terminal device may randomly select one of the preamble and the OCC, and determine the other based on the mapping relationship between the preamble and the OCC. For example, the terminal device randomly selects the preamble, and then may determine, based on the mapping relationship between the preamble and the OCC, the OCC corresponding to the preamble. Alternatively, the terminal device randomly selects the OCC, and then may determine, based on the mapping relationship between the preamble and the OCC, the preamble corresponding to the OCC, to improve efficiency of selecting, by the terminal device, the preamble and the OCC. In an example, it is assumed that the terminal device transmits the preamble by using two symbols. When the terminal device uses preamble 0, an OCC used by the terminal device to scramble the first identification information is, for example, [+1 +1], and when the terminal device uses preamble 1, an OCC used by the terminal device to scramble the first identification information is, for example, [+1 −1]. When the terminal device sends more than two preambles, all preambles may be divided into two groups, and each group corresponds to two OCCs. Configuration information of the preamble and the OCC may be configured by using signaling such as a physical broadcast channel (PBCH), remaining minimum system information (RMSI), other system information (OSI), or radio resource control (RRC), or may be directly provided in a standard. In this embodiment, there is correlation between the preamble and the OCC in the first message, and it is convenient for the network device to obtain the first message through detection. For example, the network device obtains the preamble through detection, and may obtain, through detection based on the mapping relationship between the preamble and the OCC, the first identifier scrambled by using the OCC, to improve efficiency of receiving, by the network device, the first message.

In some other implementations, there is a mapping relationship between a frequency domain resource used to send the preamble and a frequency domain resource used to send the first identification information. In this way, after randomly selecting the frequency domain resource used to send the preamble, the terminal device can quickly determine, based on the mapping relationship between the frequency domain resource used to send the preamble and the frequency domain resource used to send the first identification information, the frequency domain resource used to send the first identification information, to improve efficiency of determining, by the terminal device, the frequency domain resource used to send the preamble and the frequency domain resource used to send the first identification information. In addition, it is also convenient for the network device to detect the first message. For example, the preamble is a sequence. The network device may first obtain the preamble through detection, and then quickly learn, based on the mapping relationship between the frequency domain resource used to send the preamble and the frequency domain resource used to send the first identification information, the frequency domain resource used to send the first identification information, and receive the first identification information on the frequency domain resource, to improve efficiency of receiving, by the network device, the first message.

There is the mapping relationship between the preamble and the OCC or there is the mapping relationship between the frequency domain resource used to send the preamble and the frequency domain resource used to send the first identification information, which may be provided in a standard, or may be configured by the network device in RMSI/OSI.

In this embodiment, that there is the mapping relationship between the frequency domain resource used to send the preamble and the frequency domain resource used to send the first identification information may include two cases:

Case 1: The frequency domain resource used to send the preamble sequence is the same as the frequency domain resource used to send the first identification information. In other words, the preamble and the first identification information are sent on a same frequency domain resource.

Case 2: There is a preset offset between the frequency domain resource used to send the preamble sequence and the frequency domain resource used to send the first identification information. The preset offset is configured by the network device according to an actual requirement, or is provided in a standard. Offsets between frequency domain resources corresponding to different preamble sequences and frequency domain resources corresponding to different first identification information may be the same or different.

In still some other implementations, the first message in this embodiment further includes a sequence number of the preamble sequence. In this way, in a scenario in which there is no mapping relationship between the preamble and the OCC, when the network device has not received the preamble but has received the first identification information and the sequence number of the preamble, the network device may determine an RA-RNTI of the terminal device based on the OCC used to scramble the first identification information and a sequence number of a time-frequency resource of the preamble (it is assumed that the frequency domain resource used to send the first identification information is the same as the frequency domain resource used to send the preamble). Then, the network device indicates, by using a PDCCH scrambled by using the RA-RNTI, the terminal device to resend the preamble or the preamble and the first identification information based on the sequence number of the preamble.

Optionally, in this embodiment, the sequence number of the preamble sequence and the first identification information are sent on a same time-frequency resource, that is, both the sequence number of the preamble sequence and the first identification information are carried on a PUSCH. In this way, when obtaining either of the first identification information and the sequence number of the preamble through blind detection, the network device can receive the other, to reduce complexity of blind detection and reduce a resource occupied by the first message.

In yet some other implementations, the first message further includes a sequence number of the preamble sequence and a sequence number of the frequency domain resource used to send the preamble sequence (for example, a sequence number of the foregoing interlace). In this way, in a scenario in which there is no mapping relationship between the preamble and the OCC, and the frequency domain resource used to send the first identification information is different from the frequency domain resource used to send the preamble sequence, when the network device has not received the preamble but has received the first identification information, the sequence number of the preamble, and the sequence number of the frequency domain resource used to send the preamble sequence, the network device may determine an RA-RNTI of the terminal device based on the OCC used to scramble the first identification information and the sequence number of the frequency domain resource used to send the preamble. Then, the network device indicates, by using a PDCCH scrambled by using the RA-RNTI, the terminal device to resend the preamble or the preamble and the first identification information based on the sequence number of the preamble.

Optionally, in this embodiment, all of the sequence number of the preamble sequence, the first identification information, and the sequence number of the frequency domain resource used to send the preamble sequence are sent on a same time-frequency resource, that is, all of the sequence number of the preamble sequence, the first identification information, and the sequence number of the frequency domain resource used to send the preamble sequence are carried on a PUSCH. In this way, when obtaining, through blind detection, any one of the first identification information, the sequence number of the preamble, and the sequence number of the frequency domain resource used to send the preamble sequence, the network device can receive the other two, to reduce complexity of blind detection of the network device and reduce a resource occupied by the first message.

A length of the preamble is not limited in this embodiment. For example, the preamble may be a sequence with a length of 139, or may be a DMRS sequence with a length of 120, for example, a DMRS sequence in Multefire (another cellular standard operating on an unlicensed frequency band).

In this embodiment, the frequency domain resource and a time domain resource that are used for the preamble may be provided in a standard, or may be configured by the network device in RMSI/OSI.

Figure 7:
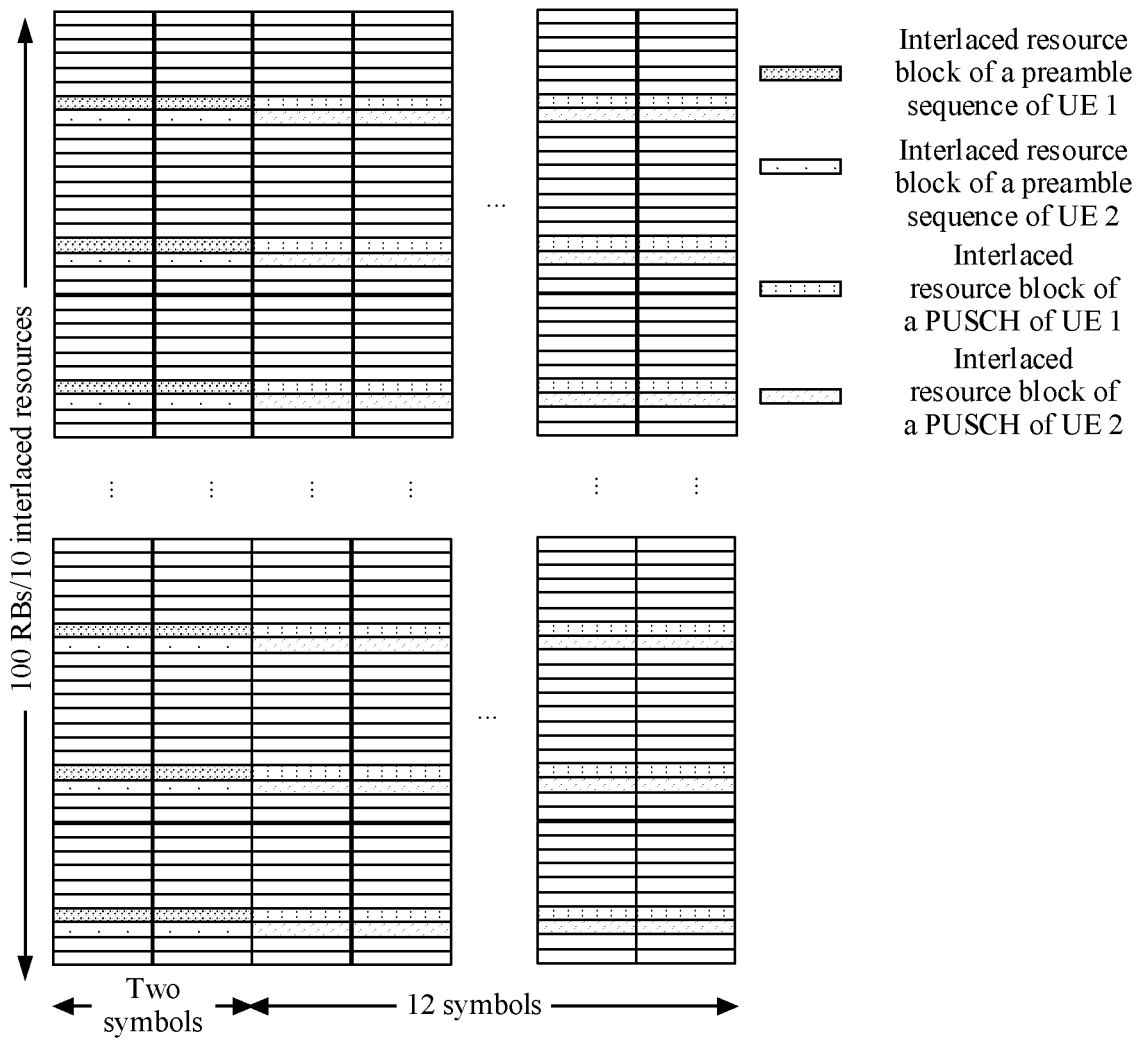
FIG. 7 is a schematic diagram of allocating a resource used to send a first message according to Embodiment 3 of this application.

In some implementations of this embodiment, if an allocation manner of the frequency domain resource used to send the preamble is an interlaced resource allocation manner, a configuration manner of the frequency domain resource of the preamble is shown in FIG. 7.

For example, as shown in FIG. 7, it is assumed that an allocation manner of a frequency domain resource used to send the first message is an interlaced resource allocation manner, duration of the first message is 14 symbols, the preamble lasts for two symbols, a channel bandwidth is 20 MHz, and a length of the preamble is 139. As shown in FIG. 7, the preamble occupies, in frequency domain, two extra RBs and one interlace (for example, interlace 5) that includes 10 RBs, and each RB includes 12 subcarriers. The two extra RBs may be two RBs in another interlace (namely, an interlace other than the interlace 5), or may be any two of six RBs other than the interlaces (it can be learned from the foregoing that 20 MHz includes 106 RBs, 100 RBs are divided into 10 interlaces, and six RBs remain). In this embodiment, when the two extra RBs are RBs in another interlace, six interlaces include 6*10*12=720 subcarriers, and a length of five groups of preambles is 139*5=695. Therefore, the six interlaces may be used to send five groups of preambles. It can be learned from the foregoing that a quantity of preambles sent on a channel can be increased by using the interlaced resource allocation manner, to increase a capacity of the channel.

In FIG. 7, interlaced resource allocation may be alternatively uneven, that is, an interval between every two adjacent RBs in an interlace may not always be the same, so that the network device can estimate a timing advance more precisely.

Still referring to FIG. 7, in this embodiment, the interlaced resource allocation manner is used, so that a capacity of a communications system can be increased. For example, in an example, when 10 interlaces are used to transmit 10 different groups of preambles, each group may include six different preambles, and each preamble corresponds to a different OCC. When a PUSCH lasts for 12 symbols, a quantity of available OCCs is 12. In this case, the communications system can support a case in which 10*6=60 different terminal devices perform random access at the same time without collision.

In another example, when 10 interlaces are used to transmit five different groups of preambles, each group may include 12 different preambles, and each preamble corresponds to a different OCC. When a PUSCH lasts for 12 symbols, a quantity of available OCCs is 12. In this case, the communications system can support a case in which 5*12=60 different UEs perform random access without collision. In addition, in this scenario, each preamble corresponds to two interlaces. Therefore, each preamble can be repeatedly sent twice, to increase a sending success rate of the preamble.

It should be noted that it can be learned from the foregoing that if the frequency domain resource used to send the preamble is different from the frequency domain resource used to send the first identification information, a sequence number that is of the frequency domain resource used to send the first message and that is used to calculate the RA-RNTI may be a sequence number of the frequency domain resource used to send the first identification information, or a sequence number of the frequency domain resource used to send the preamble, or an average value or a sum value of the sequence number of the frequency domain resource used to send the first identification information and the sequence number of the frequency domain resource used to send the preamble. Similarly, a sequence number that is of a time domain resource used for the first message and that is used to calculate the RA-RNTI may be a sequence number of a time domain resource used to send the first identification information, or may be a sequence number of the time domain resource used to send the preamble.

S602. The network device receives the first message sent by the terminal device.

In an example, if there is the mapping relationship between the preamble sequence and the OCC, S602 may include S602a and S602b.

S602a. The network device blindly detects a time-frequency resource used for random access, and obtains the preamble sequence through detection.

S602b. The network device receives, based on the mapping relationship between the preamble sequence obtained through detection and the OCC, the first identification information scrambled by using the OCC.

Specifically, the preamble is a sequence, and is easily obtained by the network device through detection. After the network device obtains the preamble through detection, for example, preamble 1, because there is a mapping relationship between preamble 1 and OCC 1, the network device can determine that the OCC used to scramble the first identification information is OCC 1. The network device performs blind detection by using the OCC 1 on the time-frequency resource used for random access, and can receive the first identification information sent by the terminal device, to reduce complexity of blindly detecting, by the network device, the first identification information, quickly detect the first identification information, and further reduce a random access delay.

In another example, if there is the mapping relationship between the frequency domain resource used to send the preamble sequence and the frequency domain resource used to send the first identification information, S602 may include S602c and S602d.

S602c. The network device blindly detects a time-frequency resource used for random access, and obtains, through detection, the frequency domain resource used to send the preamble sequence.

S602d. The network device obtains, based on the mapping relationship between the frequency domain resource used to send the preamble sequence and the frequency domain resource used to send the first identification information, the frequency domain resource used to send the first identification information, and receives the first identification information on the frequency domain resource used to send the first identification information.

Specifically, after obtaining the preamble through detection, the network device may obtain the frequency domain resource used to send the preamble. In this way, the network device can obtain, based on the mapping relationship between the frequency domain resource used to send the preamble and the frequency domain resource used to send the first identification information, the frequency domain resource used to send the first identification information. The network device receives the first identification information on the frequency domain resource used to send the first identification information, to reduce complexity of blindly detecting, by the network device, the first identification information, quickly receive the first identification information, and further reduce a random access delay.

In this embodiment, a result of receiving, by the network device, the first message and a subsequent action include the following several cases:

In a first case, when the network device has not received the preamble and the first identification information in the first message, current random access fails, and the terminal device resends, in a next available random access channel (RACH) resource window, the preamble and the scrambled first identification information.

In a second case, when the network device has received the preamble and the first identification information in the first message, the network device sends a second message in a random access response message (RAR) window to reply to the terminal device.

In a third case, when the network device successfully receives the preamble sent by the terminal device, but fails to decode the first identification information, the network device may obtain, based on the mapping relationship between the preamble and the OCC, the OCC used to scramble the first identification information, and calculate the RA-RNTI of the terminal device based on the OCC and a sequence number of a time-frequency resource of the preamble. The network device may indicate, by using the PDCCH scrambled by using the RA-RNTI, the terminal device to resend the first identification information. To be specific, the sequence number of the frequency domain resource used to send the first identification information (for example, a sequence number of an interlace used to send the first identification information) and the time domain resource used to send the first identification information are added to a media access control control element (MAC CE) of a PDSCH indicated by the PDCCH, and optionally, information about the OCC used to scramble the first identification information may be further added.

In a fourth case, when the network device successfully receives the first identification information sent by the terminal device, but fails to decode the preamble, the following is included.

If there is the mapping relationship between the preamble and the OCC, the network device obtains the OCC used to scramble the first identification information, obtains, based on the mapping relationship between the preamble and the OCC, the sequence number of the preamble corresponding to the OCC, and calculates, based on the OCC and the sequence number of the time-frequency resource of the preamble, the RA-RNTI of the terminal device sending the first message. The network device may indicate, by using the PDCCH scrambled by using the RA-RNTI, the terminal device to resend the preamble or the preamble and the first identification information. To be specific, the sequence number of the frequency domain resource used to send the preamble (for example, a sequence number of an interlace used to send the preamble), the time domain resource, and the sequence number of the preamble corresponding to the OCC are added to a MAC CE of a PDSCH indicated by the PDCCH.

If there is no mapping relationship between the preamble and the OCC, the first message includes the sequence number of the preamble, and the frequency domain resource used to send the first identification information is the same as the frequency domain resource used to send the preamble, the network device may determine the RA-RNTI of the terminal device based on the OCC used to scramble the first identification information and the sequence number of the time-frequency resource of the preamble. Then, the network device indicates, by using the PDCCH scrambled by using the RA-RNTI, the terminal device to resend the preamble or the preamble and the first identification information. To be specific, the sequence number of the frequency domain resource used to send the preamble, the time domain resource, and the sequence number of the preamble are added to a MAC CE of a PDSCH indicated by the PDCCH.

It should be noted that both of the foregoing cases are for a scenario in which the frequency domain resource used to send the first identification information is the same as the frequency domain resource used to send the preamble.

If there is no mapping relationship between the preamble and the OCC, the first message includes the sequence number of the preamble and the sequence number of the frequency domain resource used to send the preamble sequence, and the frequency domain resource used to send the first identification information is different from the frequency domain resource used to send the preamble, the network device may determine the RA-RNTI of the terminal device based on the OCC used to scramble the first identification information and the sequence number of the frequency domain resource used to send the preamble. Then, the network device indicates, by using the PDCCH scrambled by using the RA-RNTI, the terminal device to resend the preamble or the preamble and the first identification information. To be specific, the sequence number of the frequency domain resource used to send the preamble, the time domain resource, and the sequence number of the preamble are added to a MAC CE of a PDSCH indicated by the PDCCH.

S603. The network device scrambles the PDCCH by using the RA-RNTI of the terminal device, and sends the second message to the terminal device on a time-frequency resource indicated by the scrambled PDCCH, where the second message includes a timing advance, and the RA-RNTI is determined by using the OCC used to scramble the first identification information.

The second message in this embodiment not only includes identification information of one or more terminal devices that succeed in random access, but also includes the timing advance obtained in the foregoing step.

In this step, a method for generating, by the network device, the timing advance based on the preamble sequence is the same as an existing method, and details are not described in this embodiment.

In this embodiment, the network device generates the timing advance for the terminal device, adds the timing advance to the second message, and sends the second message to the terminal device. In this way, when sending a message to the network device next time, the terminal device sends the message to the network device based on the timing advance, to implement uplink synchronization.

S604. After receiving the PDCCH that is scrambled by using the RA-RNTI and that is sent by the network device, the terminal device sending the first message receives, based on the PDCCH, the second message sent by the network device.

S605. The terminal device sending the first message sends a third message or a fourth message to the network device.

For a specific process of S604 and S605, refer to descriptions of the foregoing embodiments, and details are not described herein again.

In the random access method provided in this embodiment, the first identification information of the terminal device and the preamble are added to the first message, so that the network device generates the timing advance for the terminal device, to enable the terminal device to send the message to the network device based on the timing advance, to improve uplink synchronization precision of each terminal device.

In some implementations, the first message in this embodiment further includes information about an optimal downlink transmit beam of the network device.

In some implementations, for example, when the communications system in this embodiment is a high frequency system, the first message in this embodiment may further carry the information about the optimal downlink transmit beam of the network device, so that the network device sends the second message to the terminal device on the optimal downlink transmit beam, to improve efficiency of sending the second message.

Optionally, the information about the optimal downlink transmit beam of the network device may be a sequence number of the optimal downlink transmit beam of the network device.

In some implementations, the first message in this embodiment further includes information about at least one downlink transmit beam of the network device.

To be specific, in this embodiment, the first message includes the information about the at least one downlink transmit beam of the network device. In this way, the network device can select one downlink transmit beam from the at least one downlink transmit beam to send the second message.

Optionally, the information about the at least one downlink transmit beam is a sequence number of the at least one downlink transmit beam.

It may be understood that in the foregoing embodiments, operations and steps implemented by the terminal device may be implemented by a component (for example, a chip or a circuit) that may be used for the terminal device, and operations and steps implemented by the network device may be implemented by a component (for example, a chip or a circuit) that may be used for the network device. This is not limited in this embodiment of this application.

Figure 8:
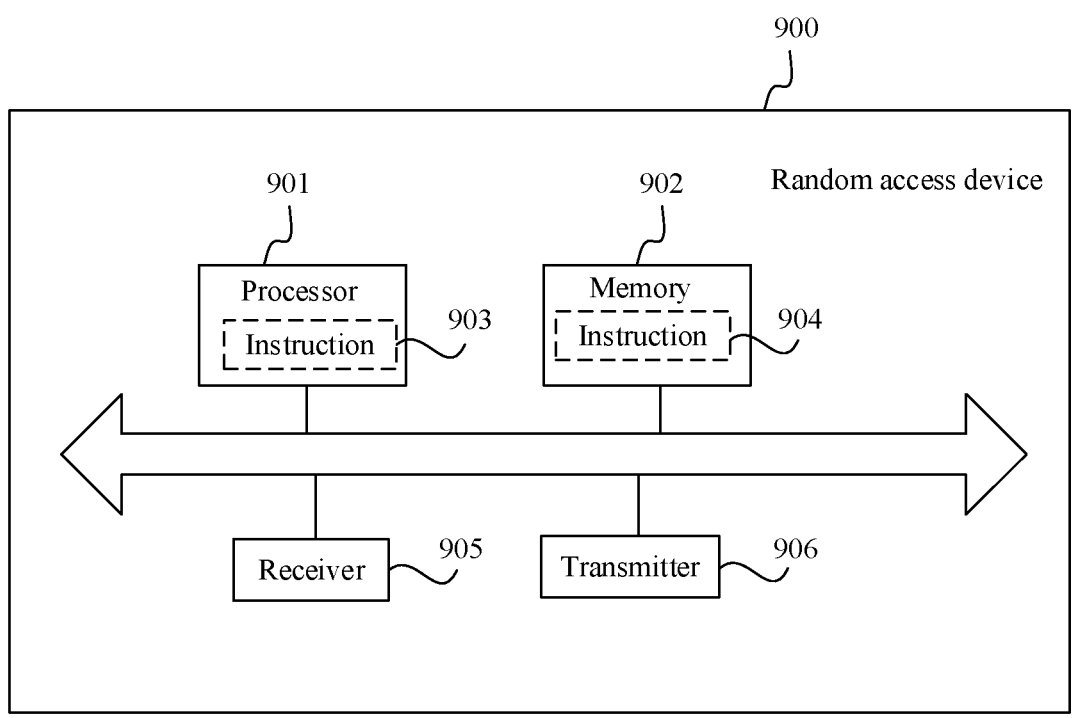
FIG. 8 is a schematic structural diagram of a random access device according to an embodiment of this application.

FIG. 8 is a schematic structural diagram of a random access device according to an embodiment of this application. As shown in FIG. 8, the random access device 900 in this embodiment may be a terminal device (or a component that may be used for the terminal device) or a network device (or a component that may be used for the network device) mentioned in the foregoing method embodiments. The random access device may be configured to implement the method corresponding to the terminal device or the network device described in the foregoing method embodiments. For details, refer to the descriptions in the foregoing method embodiments.

The random access device 900 may include one or more processors 901. The processor 901 may be alternatively referred to as a processing unit, and may implement a specific control or processing function. The processor 901 may be a general purpose processor, a dedicated processor, or the like, for example, may be a baseband processor or a central processing unit. The baseband processor may be configured to process a communications protocol and communication data, and the central processing unit may be configured to control the communications apparatus, execute a software program, and process data of the software program.

In an optional design, the processor 901 may further store an instruction 903 or data (for example, intermediate data). The instruction 903 may be run by the processor, to enable the random access device 900 to perform the method corresponding to the terminal device or the network device described in the foregoing method embodiments.

In still another possible design, the random access device 900 may include a circuit, and the circuit may implement a sending, receiving, or communication function in the foregoing method embodiments.

Optionally, the random access device 900 may include one or more memories 902, and the memory 902 may store an instruction 904. The instruction may be run on the processor 901, to enable the random access device 900 to perform the method described in the foregoing method embodiments.

Optionally, the memory 902 may further store data. The processor 901 and the memory 902 may be disposed separately, or may be integrated together.

Optionally, the random access device 900 may further include a receiver 905 and a transmitter 906. The receiver 905 and the transmitter 906 may be disposed separately, or may be integrated together. The processor 901 may be referred to as a processing unit, and control a random access apparatus (a terminal device or a network device). The receiver 905 may be referred to as a receiving unit, a receiving circuit, or the like, and is configured to implement a receiving function of the random access device. The transmitter 906 may be referred to as a sending unit, a sending circuit, or the like, and is configured to implement a sending function of the random access device.

In a design, if the random access device 900 is configured to implement operations corresponding to the terminal device in the foregoing embodiments, for example, the transmitter 906 may send a first message to the network device, where the first message includes first identification information scrambled by using an orthogonal cover code OCC, and the first message is used by the terminal device corresponding to the first identification information to request random access to the network device, and the receiver 905 may receive a second message sent by the network device, where the second message includes identification information of one or more terminal devices that succeed in random access; and determine, based on whether the identification information of the one or more terminal devices includes the first identification information, whether the random access succeeds.

Optionally, an RA-RNTI of the terminal device is determined by using the OCC used to scramble the first identification information.

For specific implementation processes of the transmitter 906, the receiver 905, and the processor 901, refer to related descriptions in the foregoing embodiments. Details are not described herein again.

In another design, if the random access device is configured to implement operations corresponding to the network device in the foregoing embodiments, for example, the receiver is configured to receive a first message sent by the terminal device, and the transmitter is configured to send a second message to the terminal device based on the first message. The first message includes first identification information scrambled by using an OCC, the first message is used by the terminal device corresponding to the first identification information to request random access to the network device, the second message includes identification information of one or more terminal devices that succeed in random access, and the identification information of the one or more terminal devices includes the first identification information.

Optionally, the transmitter is specifically configured to scramble a PDCCH by using a RA-RNTI of the terminal device, and send the second message to the terminal device on a time-frequency resource indicated by the scrambled PDCCH, where the RA-RNTI is determined by using the OCC used to scramble the first identification information.

For specific implementation processes of the transmitter 906, the receiver 905, and the processor 901, refer to related descriptions of the network device in the foregoing embodiments. Details are not described herein again.

The processor 901, the receiver 905, and the transmitter 906 described in this application may be implemented on an integrated circuit (IC), an analog IC, a radio frequency integrated circuit (RFIC), a mixed-signal IC, an application specific integrated circuit (ASIC), a printed circuit board (PCB), an electronic device, and the like. The processor 901, the receiver 905, and the transmitter 906 may also be manufactured by using various 1C process technologies, for example, a complementary metal oxide semiconductor (CMOS), an nMetal-oxide-semiconductor (NMOS), a P-channel metal oxide semiconductor (PMOS), a bipolar junction transistor (BJT), a bipolar CMOS (BiCMOS), silicon-germanium (SiGe), gallium arsenide (GaAs), and the like.

In the descriptions of the foregoing embodiments, the random access device 900 is described by using the terminal device or the network device as an example. However, a range of the random access device in this application is not limited to the terminal device or the network device, and a structure of the random access device may not be limited to FIG. 8. The random access device 900 may be an independent device or may be a part of a large device. For example, the device may be:

(1) an independent integrated circuit IC, chip, or chip system or subsystem;
(2) a set of one or more ICs, where optionally, the IC set may further include a storage component configured to store data and/or an instruction;
(3) an ASIC such as a modem (MSM);
(4) a module that can be embedded in another device;
(5) a receiver, a terminal, a cellular phone, a wireless device, a handheld device, a mobile unit, a network device, or the like; or
(6) another device.

Figure 9:
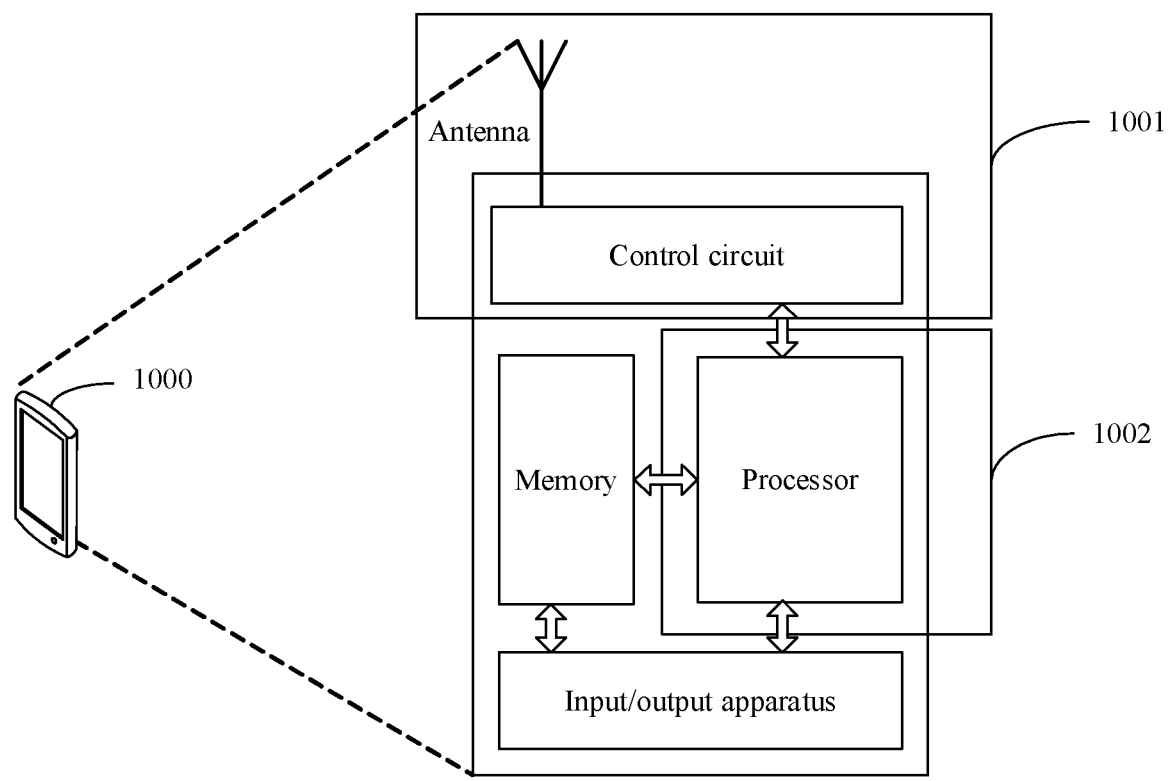
FIG. 9 is a schematic structural diagram of a terminal device according to an embodiment of this application.

FIG. 9 is a schematic structural diagram of a terminal device according to an embodiment of this application. The terminal device may be the terminal device described in the foregoing embodiments of this application. For ease of description, FIG. 9 shows only main components of the terminal device. As shown in FIG. 9, the terminal device 1000 includes a processor, a memory, a control circuit, an antenna, and an input/output apparatus. The processor is mainly configured to: process a communications protocol and communications data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus, such as a touchscreen, a display screen, or a keyboard, is mainly configured to receive data entered by a user and output data to the user.

After the terminal is powered on, the processor can read the software program in a memory, interpret and execute an instruction of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communications data, and the central processing unit is mainly configured to: control the entire terminal, execute the software program, and process the data of the software program. Functions of the baseband processor and the central processing unit are integrated into the processor in FIG. 9. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal may include a plurality of central processing units to improve a processing capability of the terminal, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of a software program. The processor executes the software program to implement a baseband processing function.

In an example, the antenna and the control circuit that have receiving and sending functions may be considered as a transceiver 1001 of the terminal device 1000. As shown in FIG. 9, the terminal device 1000 includes the transceiver 1001 and the processor 1002. Optionally, a component that is in the transceiver unit 1001 and is configured to implement a receiving function may be considered as a receiver, and a component that is in the transceiver unit 1001 and is configured to implement a sending function may be considered as a transmitter, that is, the transceiver unit 1001 includes the receiver and the transmitter. For example, the receiver may also be referred to as a receiver, a receiving circuit, or the like, and the transmitter may be referred to as a transmitter, a sending circuit, or the like.

Figure 10:
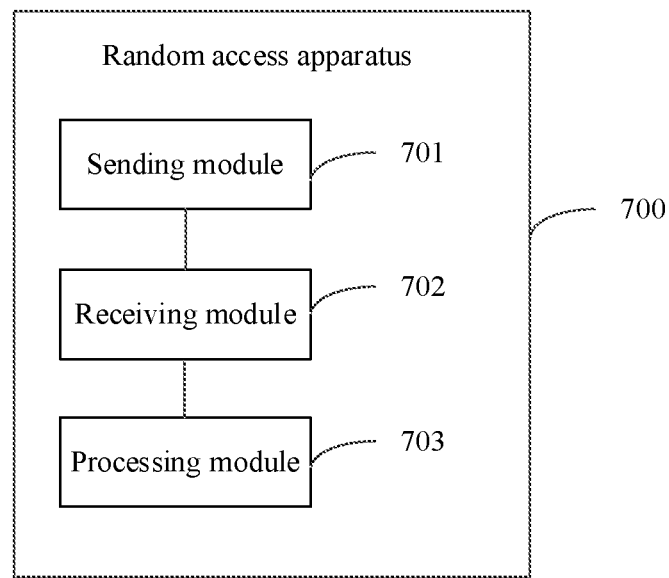
FIG. 10 is a schematic structural diagram of a random access apparatus according to an embodiment of this application.

FIG. 10 is a schematic structural diagram of a random access apparatus according to an embodiment of this application. The random access apparatus may be a terminal device, or may be a component (for example, an integrated circuit or a chip) of a terminal device, or may be another communications module, configured to implement an operation or a step of the terminal device in the foregoing method embodiments. The random access apparatus 700 may include a sending module 701, a receiving module 702, and a processing module 703.

The sending module 701 is configured to send a first message to a network device, where the first message includes first identification information scrambled by using an OCC, and the first message is used by a terminal device corresponding to the first identification information to request random access to the network device.

The receiving module 702 is configured to receive a second message sent by the network device, where the second message includes identification information of one or more terminal devices that succeed in random access.

The processing module 703 is configured to determine, based on whether the identification information of the one or more terminal devices includes the first identification information, whether the random access succeeds.

The random access apparatus in this embodiment may be configured to execute the technical solutions of the terminal device in the foregoing method embodiments. The implementation principles and technical effects are similar, and details are not further described herein.

In some implementations, the first message in this embodiment further includes a preamble sequence.

Optionally, there is a mapping relationship between the preamble sequence and the OCC, or there is a mapping relationship between a frequency domain resource used to send the preamble sequence and a frequency domain resource used to send the first identification information.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

In some other implementations, a random access radio network temporary identifier RA-RNTI of the terminal device is determined by using the OCC used to scramble the first identification information.

Optionally, the RA-RNTI is determined by using the OCC used to scramble the first identification information, a sequence number of a frequency domain resource used to send the first message, and a sequence number of a time domain resource used to send the first message and/or a total quantity of OCCs available for the terminal device.

Optionally, if an allocation manner of a frequency domain resource used to send the first message is an interlaced resource allocation manner, a sequence number of the frequency domain resource used to send the first message is a sequence number, of the frequency domain resource used to send the first message, in interlaced resource allocation.

Optionally, the sending module is further configured to: if the identification information of the one or more terminal devices includes the first identification information, send a third message to the network device, where the third message is used to indicate that the terminal device corresponding to the first identification information succeeds in the random access; or if the identification information of the one or more terminal devices does not include the first identification information, or the second message fails to be decoded, send a fourth message to the network device, to enable the network device to resend the second message to the terminal device based on the fourth message, where the fourth message is used to indicate that the terminal device corresponding to the first identification information fails in the random access.

Optionally, the first message further includes a sequence number of the preamble sequence, or the first message further includes a sequence number of the preamble sequence and a sequence number of a frequency domain resource used to send the preamble sequence.

Optionally, the sequence number of the preamble sequence and the first identification information are sent on a same time-frequency resource, or
all of the sequence number of the preamble sequence, the first identification information, and the sequence number of the frequency domain resource used to send the preamble sequence are sent on a same time-frequency resource.

Optionally, the first message further includes information about an optimal downlink transmit beam of the network device.

Optionally, the second message further includes configuration information of a PUCCH used to send the third message or used to send the fourth message.

Optionally, the first identification information is a global unique network identifier S-TMSI of the terminal device.

Optionally, if the terminal device is out of synchronization in the uplink and synchronized in the downlink, the first identification information is a cell radio network temporary identifier C-RNTI of the terminal device.

Optionally, the sending module 701 is further configured to: if a time-frequency resource available for sending the first message is greater than a time-frequency resource occupied by the first message, perform LBT in a plurality of symbol locations in the time-frequency resource available for sending the first message, and send the first message in the first symbol location in which LBT succeeds.

Optionally, the receiving module 702 is specifically configured to: after receiving a PDCCH that is scrambled by using the RA-RNTI and that is sent by the network device, receive, based on the PDCCH, the second message sent by the network device.

Optionally, the processing module 703 is further configured to: randomly select an OCC from a plurality of OCCs available for the terminal device, and scramble the first identification information by using the selected OCC.

The sending module 701 is configured to send, to the network device on a randomly selected time-frequency resource used for random access, the first message carrying the scrambled first identification information.

Optionally, the second message further includes a timing advance timing advance.

The random access apparatus in this embodiment may be configured to execute the technical solutions of the terminal device in the foregoing method embodiments. The implementation principles and technical effects are similar, and details are not further described herein.

Figure 11:
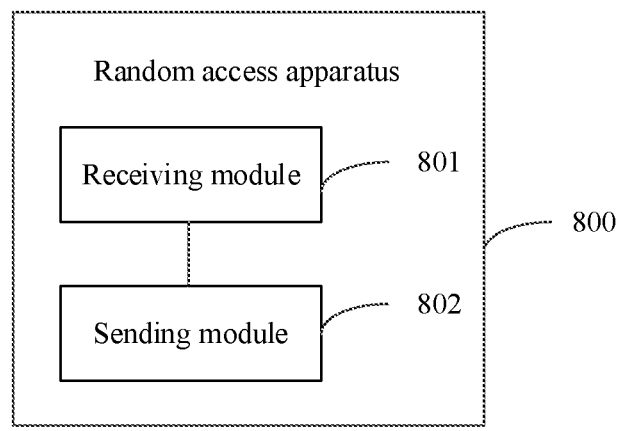
FIG. 11 is a schematic structural diagram of a random access apparatus according to an embodiment of this application.

FIG. 11 is a schematic structural diagram of a random access apparatus according to an embodiment of this application. The random access apparatus may be a network device, or may be a component (for example, an integrated circuit or a chip) of a network device, or may be another communications module, configured to implement an operation of the network device in the foregoing method embodiments. The random access apparatus 800 may include a receiving module 801 and a sending module 802.

The receiving module 801 is configured to receive a first message sent by a terminal device, where the first message includes first identification information scrambled by using an OCC, and the first message is used by the terminal device corresponding to the first identification information to request random access to the network device.

The sending module 802 is configured to send a second message to the terminal device based on the first message, where the second message includes identification information of one or more terminal devices that succeed in random access, and the identification information of the one or more terminal devices includes the first identification information.

The random access apparatus in this embodiment may be configured to execute the technical solutions of the network device in the foregoing method embodiments. The implementation principles and technical effects are similar, and details are not further described herein.

In some implementations, the first message further includes a preamble sequence.

Optionally, there is a mapping relationship between the preamble sequence and the OCC, or there is a mapping relationship between a frequency domain resource used to send the preamble sequence and a frequency domain resource used to send the first identification information.

Optionally, the frequency domain resource used to send the preamble sequence is the same as the frequency domain resource used to send the first identification information, or there is a preset offset between the frequency domain resource used to send the preamble sequence and the frequency domain resource used to send the first identification information.

Optionally, if there is the mapping relationship between the preamble sequence and the OCC, the receiving module 801 is specifically configured to: blindly detect a time-frequency resource used for random access, detect the preamble sequence, and receive, based on the mapping relationship between the preamble sequence and the OCC, the first identification information scrambled by using the OCC.

Optionally, if there is the mapping relationship between the frequency domain resource used to send the preamble sequence and the frequency domain resource used to send the first identification information, the receiving module 801 is specifically configured to: blindly detect a time-frequency resource used for random access, obtain, through detection, the frequency domain resource used to send the preamble sequence, obtain, based on the mapping relationship between the frequency domain resource used to send the preamble sequence and the frequency domain resource used to send the first identification information, the frequency domain resource used to send the first identification information, and receive the first identification information on the frequency domain resource used to send the first identification information.

Optionally, the sending module 802 is specifically configured to scramble a PDCCH by using a random access radio network temporary identifier RA-RNTI of the terminal device, and send the second message to the terminal device on a time-frequency resource indicated by the scrambled PDCCH, where the RA-RNTI is determined by using the OCC used to scramble the first identification information.

Optionally, the RA-RNTI is determined by using the OCC used to scramble the first identification information, a sequence number of a frequency domain resource used to send the first message, and a sequence number of a time domain resource used to send the first message and/or a total quantity of OCCs available for the terminal device.

Optionally, if an allocation manner of the frequency domain resource used to send the first message is an interlaced resource allocation manner, the sequence number of the frequency domain resource used to send the first message is a sequence number, of the frequency domain resource used to send the first message, in interlaced resource allocation.

Optionally, the receiving module 801 is further configured to receive a third message sent by the terminal device, where the third message is used to indicate that the terminal device corresponding to the first identification information succeeds in the random access; or configured to receive a fourth message sent by the terminal device, where the fourth message is used to indicate that the terminal device corresponding to the first identification information fails in the random access; and the sending module 802 is further configured to resend the second message to the terminal device based on the fourth message.

Optionally, the first message further includes a sequence number of the preamble sequence, or the first message further includes a sequence number of the preamble sequence and a sequence number of a frequency domain resource used to send the preamble sequence.

Optionally, the sequence number of the preamble sequence and the first identification information are sent on a same time-frequency resource, or all of the sequence number of the preamble sequence, the first identification information, and the sequence number of the frequency domain resource used to send the preamble sequence are sent on a same time-frequency resource.

Optionally, the first message further includes information about an optimal downlink transmit beam of the network device.

Optionally, the second message further includes configuration information of a PUCCH used to send the third message or used to send the fourth message.

Optionally, the first identification information is a global unique network identifier S-TMSI of the terminal device.

Optionally, if the terminal device is out of synchronization in the uplink and synchronized in the downlink, the first identification information is a cell radio network temporary identifier C-RNTI of the terminal device.

Optionally, the second message further includes a timing advance generated based on the preamble sequence.

The random access apparatus in this embodiment may be configured to execute the technical solutions of the network device in the foregoing method embodiments. The implementation principles and technical effects are similar, and details are not further described herein.

It should be noted that, division into modules in the embodiments of this application is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Disk, SSD)), or the like.

What is claimed is:

1. A random access method, comprising:
   sending a first message to a network device, wherein the first message comprises first identification information scrambled by using an orthogonal cover code, where the first message is sent by a terminal device corresponding to the first identification information to request random access to the network device, and where a random access radio network temporary identifier of the terminal device is determined by using the orthogonal cover code; and
   receiving a second message sent by the network device, wherein the second message comprises identification information of one or more terminal devices that succeed in random access, and determining, based on whether the identification information of the one or more terminal devices comprises the first identification information, whether the random access succeeds.

2. The method according to claim 1, wherein the first message further comprises a preamble sequence.

3. The method according to claim 2, wherein there is a mapping relationship between the preamble sequence and the orthogonal cover code, or there is a mapping relationship between a frequency domain resource used to send the preamble sequence and a frequency domain resource used to send the first identification information.

4. The method according to claim 3, wherein the frequency domain resource used to send the preamble sequence is the same as the frequency domain resource used to send the first identification information, or there is a preset offset between the frequency domain resource used to send the preamble sequence and the frequency domain resource used to send the first identification information.

5. The method according to claim 2, wherein the first message further comprises a sequence number of the preamble sequence, or the first message further comprises the sequence number of the preamble sequence and a sequence number of a frequency domain resource used to send the preamble sequence.

6. The method according to claim 5, wherein the sequence number of the preamble sequence and the first identification information are sent on a same time-frequency resource, or
   the sequence number of the preamble sequence, the first identification information, and the sequence number of the frequency domain resource used to send the preamble sequence are all sent on the same time-frequency resource.

7. The method according to claim 2, wherein the second message further comprises a timing advance.

8. The method according to claim 1, wherein the random access radio network temporary identifier is determined by using the orthogonal cover code used to scramble the first identification information, a sequence number of a frequency domain resource used to send the first message, and a sequence number of a time domain resource used to send the first message and/or a total quantity of orthogonal cover codes available for the terminal device.

9. The method according to claim 1, wherein if an allocation method of a frequency domain resource used to send the first message is an interlaced resource allocation method, a sequence number of the frequency domain resource used to send the first message is a sequence number of a selected interlace resource used to send the first message.

10. The method according to claim 1, wherein after the receiving the second message sent by the network device, the method further comprises:
    if the identification information of the one or more terminal devices comprises the first identification information, sending a third message to the network device, wherein the third message indicates that the terminal device corresponding to the first identification information succeeds in the random access; or
    if the identification information of the one or more terminal devices does not comprise the first identification information of the terminal device sending the first message, or the second message fails to be decoded, sending a fourth message to the network device, to enable the network device to resend the second message to the terminal device based on the fourth message, wherein the fourth message indicates that the terminal device corresponding to the first identification information fails in the random access.

11. The method according to claim 1, wherein the first message further comprises information about an optimal downlink transmit beam of the network device.

12. The method according to claim 10, wherein the second message further comprises configuration information of a physical uplink control channel used to send the third message or used to send the fourth message.

13. The method according to claim 1, wherein the first identification information is a global unique network identifier of the terminal device.

14. The method according to claim 1, wherein if the terminal device is out of synchronization in the uplink and synchronized in the downlink, the first identification information is a cell radio network temporary identifier of the terminal device.

15. The method according to claim 1, wherein if a time-frequency resource available for sending the first message is greater than a time-frequency resource occupied by the first message, sending the first message to the network device comprises:
performing listen before talk in a plurality of symbol locations in the time-frequency resource available for sending the first message, and sending the first message in the first symbol location in which listen before talk succeeds.

16. The method according to claim 1, wherein receiving the second message sent by the network device comprises:
after receiving a physical downlink control channel that is scrambled by using the random access radio network temporary identifier and that is sent by the network device, receiving, based on the physical downlink control channel, the second message sent by the network device.

17. The method according to claim 1, wherein sending the first message to the network device comprises:
randomly selecting an orthogonal cover code from a plurality of orthogonal cover codes available for the terminal device, and scrambling the first identification information by using the selected orthogonal cover code; and
sending, to the network device on a randomly selected time-frequency resource used for random access, the first message carrying the scrambled first identification information.

18. A random access method, comprising:
receiving a first message sent by a terminal device, wherein the first message comprises first identification information scrambled by using an orthogonal cover code, and the first message is used by the terminal device corresponding to the first identification information to request random access to a network device, and where a random access radio network temporary identifier of the terminal device is determined by using the orthogonal cover code; and
sending a second message to the terminal device based on the first message, wherein the second message comprises identification information of one or more terminal devices that succeed in random access, and the identification information of the one or more terminal devices comprises the first identification information.

19. A random access device, comprising:
a memory having a storage medium, wherein the storage medium stores a data transmission program; and
a processor connected to the memory, the processor configured to invoke the data transmission method program stored in the memory, and further configured to execute the following: sending a first message to a network device, wherein the first message comprises first identification information scrambled by using an orthogonal cover code, where the first message is used by a terminal device corresponding to the first identification information to request random access to the network device, and where a random access radio network temporary identifier of the terminal device is determined by using the orthogonal cover code; and
receiving a second message sent by the network device, wherein the second message comprises identification information of one or more terminal devices that succeed in random access, and determining, based on whether the identification information of the one or more terminal devices comprises the first identification information, whether the random access succeeds.

* * * * *

UNITED STATES PATENT AND TRADEMARK OFFICE
CERTIFICATE OF CORRECTION

| | | |
|---|---|---|
| PATENT NO. | : 11,882,603 B2 | |
| APPLICATION NO. | : 17/171076 | |
| DATED | : January 23, 2024 | |
| INVENTOR(S) | : Ji Wu et al. | |

It is certified that error appears in the above-identified patent and that said Letters Patent is hereby corrected as shown below:

In the Claims

In Column 44, Line 34, in Claim 10, delete "after the" and insert -- after --.

Signed and Sealed this
Twenty-sixth Day of March, 2024

*Katherine Kelly Vidal*

Katherine Kelly Vidal
*Director of the United States Patent and Trademark Office*